US012170927B2

(12) United States Patent
Zhu et al.

(10) Patent No.: US 12,170,927 B2
(45) Date of Patent: Dec. 17, 2024

(54) METHOD AND APPARATUS FOR CONTROLLING QUALITY OF SERVICE

(71) Applicant: ZTE CORPORATION, Guangdong (CN)

(72) Inventors: Jinguo Zhu, Guangdong (CN); Xiaoyun Zhou, Guangdong (CN); Shuang Liang, Guangdong (CN); He Huang, Guangdong (CN)

(73) Assignee: ZTE Corporation, Shenzhen (CN)

(*) Notice: Subject to any disclaimer, the term of this patent is extended or adjusted under 35 U.S.C. 154(b) by 0 days.

(21) Appl. No.: 18/055,270

(22) Filed: Nov. 14, 2022

(65) Prior Publication Data

US 2023/0262530 A1    Aug. 17, 2023

Related U.S. Application Data

(63) Continuation of application No. 16/148,867, filed on Oct. 1, 2018, now Pat. No. 11,503,507, which is a (Continued)

(30) Foreign Application Priority Data

Apr. 1, 2016  (CN) .......................... 201610204534.5

(51) Int. Cl.
*H04W 28/24* (2009.01)
*H04W 92/10* (2009.01)
*H04W 92/24* (2009.01)

(52) U.S. Cl.
CPC ............ *H04W 28/24* (2013.01); *H04W 92/10* (2013.01); *H04W 92/24* (2013.01)

(58) Field of Classification Search
CPC ..... H04W 28/24; H04W 92/10; H04W 92/24; H04W 76/12; H04W 28/065;
(Continued)

(56) References Cited

U.S. PATENT DOCUMENTS 9,578,647 B2    2/2017    Touati et al.
9,819,469 B2    11/2017   Horn et al.
(Continued)

FOREIGN PATENT DOCUMENTS

CN    101217794 A    7/2008
CN    102308614 A    1/2012
(Continued)

OTHER PUBLICATIONS

U.S. Appl. No. 62/212,596 (Year: 2015).*
(Continued)

*Primary Examiner* — Rushil P. Sampat
(74) *Attorney, Agent, or Firm* — Perkins Coie LLP

(57) ABSTRACT

The embodiments of the present disclosure provide methods and apparatuses for control of Quality of Service (QoS). A method applied in a base station for control of QoS includes: receiving a Core Network (CN) flow identifier and information on a corresponding QoS parameter of a Packet Data Network (PDN) connection as transmitted from a CN control network element and creating a mapping relation between the CN flow identifier and the corresponding QoS parameter; and utilizing, after determining based on the received information on the QoS parameter of the PDN connection that a radio bearer satisfying a requirement of the QoS parameter exists between a user terminal and the base station, the existing radio bearer satisfying the requirement of the QoS parameter, creating a mapping relation between the existing radio bearer and the CN flow identifier of the PDN connection and transmitting information on the mapping relation to the user terminal.

14 Claims, 14 Drawing Sheets

Related U.S. Application Data continuation of application No. PCT/CN2017/078617, filed on Mar. 29, 2017.

(58) Field of Classification Search
CPC ........... H04W 72/121; H04W 72/1236; H04W 72/1273; H04W 72/543; H04W 8/24; H04W 4/70; H04W 88/16; H04L 5/00; H04L 61/00

See application file for complete search history.

(56) References Cited

U.S. PATENT DOCUMENTS

| | | | |
|---|---|---|---|
| 10,911,977 | B2 | 2/2021 | Agiwal et al. |
| 2015/0003246 | A1 | 1/2015 | Chandramouli et al. |
| 2015/0163700 | A1* | 6/2015 | Sun ................... H04W 76/18 370/331 |
| 2017/0041968 | A1 | 2/2017 | Jin |
| 2017/0126618 | A1* | 5/2017 | Bhaskaran ........... H04L 61/5014 |
| 2017/0251405 | A1* | 8/2017 | Stojanovski .......... H04W 8/082 |
| 2018/0139651 | A1* | 5/2018 | Kim ...................... H04L 5/00 |
| 2018/0295659 | A1* | 10/2018 | Shan .................... H04W 4/24 |
| 2022/0256440 | A1* | 8/2022 | Rönneke .............. H04W 76/18 |

FOREIGN PATENT DOCUMENTS

| | | |
|---|---|---|
| CN | 103248451 A | 8/2013 |
| WO | 2014008630 A1 | 1/2014 |
| WO | 2015/161411 A1 | 10/2015 |
| WO | 2015149271 A1 | 10/2015 |
| WO | WO 2017/078776 A1 * | 5/2017 |

OTHER PUBLICATIONS

Extended Search Report mailed on Feb. 5, 2020 for European Application No. 17773233.6, filed on Oct. 31, 2018 (11 pages).

International Search Report and Written Opinion mailed on Jun. 6, 2017 for International Application No. PCT/CN2017/078617, filed on Mar. 29, 2017 (14 pages).

Nokia et al., "Clarifications and Corrections related to UE-AMBR and AP-AMBR", 3GPP TSG-SA WG2 Meeting #67, Sophia Antipolis, France, S2-086152, 32 pages, Aug. 2008.

EPO, Intention to Grant for European Application No. 17773233.6, mailed on Jul. 3, 2023, 8 pages.

USPTO, Non-Final Office Action for U.S. Appl. No. 16/148,867, mail date: Apr. 3, 2020. 19 pages.

USPTO, Non-Final Office Action for U.S. Appl. No. 16/148,867, mail date: Jul. 23, 2020. 21 pages.

USPTO, Final Office Action for U.S. Appl. No. 16/148,867, mail date: Jan. 6, 2021. 26 pages.

USPTO, Non-Final Office Action for U.S. Appl. No. 16/148,867, mail date: May 21, 2021. 29 pages.

USPTO, Final Office Action for U.S. Appl. No. 16/148,867, mail date: Jan. 26, 2022. 27 pages.

Extended Search Report mailed on May 8, 2024 for European Application No. 23205107.8, filed on Mar. 29, 2017 (12 pages).

* cited by examiner

METHOD AND APPARATUS FOR CONTROLLING QUALITY OF SERVICE

CROSS-REFERENCE TO RELATED APPLICATION

This patent document is a continuation of and claims priority to U.S. patent application Ser. No. 16/148,867, filed on Oct. 1, 2018, now U.S. Pat. No. 11,503,507 which is a continuation of and claims priority to International Patent Application No. PCT/CN2017/078617, filed on Mar. 29, 2017, which claims priority to Chinese Patent Application No. 201610204534.5, filed on Apr. 1, 2016. The entire contents of the before-mentioned patent applications are incorporated by reference as part of the disclosure of this application.

TECHNICAL FIELD

The present disclosure relates to, but not limited to, mobile communication technology, and more particularly, to methods and apparatuses for control of Quality of Service (QoS).

BACKGROUND

In the 4th Generation (4G) mobile communication system, data flows having the same QoS requirements can be aggregated into a bearer, which is the smallest granularity in QoS processing at User Plane (UP) network elements such as base stations and gateways. As shown in FIG. 1, the functions of main network elements involved in QoS solutions in the 4G system are as follows.

User Equipment (UE): A UE typically accesses a 4G network via a radio air interface to obtain services. It exchanges information with a base station via an air interface and exchanges information with a Mobility Management Entity (MME) in a Core Network (CN) via Non-Access Stratum (NAS) signaling.

Base Station: A base station is responsible for scheduling air interface resources used by UEs to access a network and managing connections over the air interface.

MME: A MME is a CN Control Plane (CP) entity and mainly responsible for authentication, authorization and subscription check for UE to ensure validity of each UE. It performs mobility management for UE, including: location registration and temporary identity assignment; maintenance of IDEL and CONNECT states of UE and state transitions; handover in the CONNECT state; and maintenance of Packet Data Network (PDN) connections and bearers, including session management functions such as creating, modifying and releasing.

Serving Gateway (SGW): An SGW is a CN CP functional entity and mainly responsible for interaction with a PDN Gateway (PGW) in roaming situations. It buffers downlink data packets destined to a UE in the IDEL state and notifies an MME to page the UE. It functions as a UP anchor across base stations and a UP anchor across the 2nd Generation (2G)/the 3rd Generation (3G)/4G mobile communication systems.

PGW: A PGW is a CN CP functional entity and is an access point for UEs to access a PDN. It is responsible for assignment of IP addresses to UEs and network triggered bearer establishment, modification and deletion, and has functions of QoS control and charging. It is an anchor of UEs for handover within a 3GPP (the 3rd Generation Partnership Project) system or between a 3GPP system and a non-3GPP system, such that the IP addresses will not change and the service continuity can be guaranteed.

Policy and Charging Rules Function (PCRF): A PCRF is responsible for QoS policy control and charging policy control for radio bearers.

QoS parameters in the 4G system include a QoS Class Identifier (QCI) and an Allocation and Retention Priority (ARP). A bearer can be uniquely identified by QoS parameters. The QCI is a standardized identifier. Each QCI corresponds to a set of QoS parameters, including: a bearer type (Guaranteed Bit Rate (GBR) or non GBR), a priority, a packet delay budget and a packet error loss rate. The APR indicates a priority for a bearer to be released or retained in case of overload.

For a non GBR bearer, the QoS parameters further include an Aggregate Maximum Bit Rate (AMBR), which includes a UE-AMBR indicating an AMBR for all non GBR bearers of a UE and APN-AMBR indicating an AMBR for non GBR bearers of a UE corresponding to an Access Point Name (APN).

For a GBR bearer, the QoS parameter further include a Maximum Bit Rate (MBR) and a GBR.

In a QoS solution for the 4G system, when a bearer is established or modified, QoS requirements of the bearer can be indicated by QoS parameters. There is a 1:1:1 mapping among a radio bearer over an air interface, a bearer over an S1 interface and a bearer over an S5/S8 interface. The bearers over the S1 and S5/S8 interfaces are transmitted using a segmented GPRS Tunneling Protocol for UP (GTP-U) tunnel.

However, the QoS solution for the 4G system has the following problems.

1) When an old bearer cannot fulfill a service requirement, the PCRF entity after the PGW at the network side finally decides whether to modify the QoS parameters of the old bearer or establish a new bearer and determine the QoS parameters of the new bearer. The base station can only accept or reject the QoS parameters requested by the PCRF, but cannot adjust the QoS based on the actual radio load. In fact, the PCRF cannot obtain the current actual radio load and thus cannot make a proper QoS decision.

2) There is a 1:1 mapping between the radio bearer over the air interface and the bearer in the CN. The PCRF ensures that there would not be two bearers having the same QoS requirements in one single PDN link. However, when a UE requests the second PDN link, a different PCRF may decide to establish a bearer having the same QoS requirement as the one in the first PDN link. In this case, the UE would have two radio bearers having the same QoS, resulting in a waste of resources.

3) A bearer is an aggregation of flows. There is a 1:1 mapping between the radio bearer and the bearer at the network side. If a flow-based QoS control at the network side is desired, the base station would have to carry a large amount of data as different flows require different bearers.

SUMMARY

A summary of the subject matters described in the present disclosure will be given below. The scopes of the claims are not limited to the summary.

The present disclosure provides methods and apparatuses for control of QoS, capable of sharing a radio bearer across PDN connections. A base station can autonomously decide whether to establish a radio bearer. In this way, the accuracy of QoS control can be improved and resources over the air interface can be saved.

According to an embodiment of the present disclosure, a method applied in a base station for control of Quality of Service (QoS) is provided. The method includes: receiving a Core Network (CN) flow identifier and information on a corresponding QoS parameter of a Packet Data Network (PDN) connection as transmitted from a CN control network element and creating a mapping relation between the CN flow identifier and the corresponding QoS parameter; and utilizing, after determining based on the received information on the QoS parameter of the PDN connection that a radio bearer satisfying a requirement of the QoS parameter exists between a user terminal and the base station, the existing radio bearer satisfying the requirement of the QoS parameter, creating a mapping relation between the existing radio bearer and the CN flow identifier of the PDN connection and transmitting information on the mapping relation to the user terminal.

Optionally, the method further includes: establishing a new radio bearer between the user terminal and the base station after determining based on the received information on the QoS parameter of the PDN connection that no radio bearer satisfying the requirement of the QoS parameter exists between the user terminal and the base station, creating a mapping relation between the established new radio bearer and the CN flow identifier of the PDN connection and transmitting information on the mapping relation to the user terminal.

Optionally, the method further includes: verifying, after receiving an uplink data packet carrying a CN flow identifier from the user terminal over a radio bearer, a binding relation between the CN flow identifier and the radio bearer, and transmitting the data packet to a CN gateway when the binding relation is successfully verified; and determining, after receiving a downlink data packet carrying a CN flow identifier from the CN gateway, a radio bearer corresponding to the user terminal based on the CN flow identifier, and transmitting the data packet to the user terminal over the determined radio bearer.

Optionally, the method further includes: creating, after receiving a new CN flow identifier and information on a corresponding QoS parameter as transmitted from the CN control network element, a mapping relation between the new CN flow identifier and the corresponding QoS parameter; determining whether a radio bearer satisfying a requirement of the QoS parameter exists between the user terminal and the base station and, if so, utilizing the existing radio bearer satisfying the requirement of the QoS parameter and creating a mapping relation between the existing radio bearer and the new CN flow identifier; or otherwise establishing a new radio bearer between the user terminal and the base station and creating a mapping relation between the new radio bearer and the new CN flow identifier; and transmitting information on the mapping relation between the existing radio bearer or the new radio bearer and the new CN flow identifier to the user terminal.

Optionally, the method further includes: determining, after receiving information on a CN flow identifier to be released as transmitted from the CN control network element, a radio bearer corresponding to the CN flow identifier to be released and releasing a mapping relation between the CN flow identifier to be released and the corresponding radio bearer; and transmitting information on the CN flow identifier to be released to the user terminal.

Optionally, the method further includes: creating, after receiving the CN flow identifier and information on a corresponding new QoS parameter, a mapping relation between the CN flow identifier and the new QoS parameter; continuing to utilize the existing radio bearer when the radio bearer to which the CN flow identifier is mapped satisfies a requirement of the new QoS parameter; or utilizing, when the radio bearer to which the CN flow identifier is mapped does not satisfy the requirement of the new QoS parameter and another radio bearer satisfying the requirement of the new QoS parameter exists between the user terminal and the base station, the other radio bearer, modifying the mapping relation between the CN flow identifier and the radio bearer and transmitting information on the modified mapping relation between the CN flow identifier and the radio bearer to the user terminal; or establishing a new radio bearer between the user terminal and the base station when the radio bearer to which the CN flow identifier is mapped does not satisfy the requirement of the new QoS parameter and no radio bearer satisfying the requirement of the new QoS parameter exists between the user terminal and the base station, modifying the mapping relation between the CN flow identifier and the radio bearer and transmitting information on the modified mapping relation between the CN flow identifier and the radio bearer to the user terminal.

Optionally, the method further includes: releasing, when the existing radio bearer is not mapped to any CN flow identifier, the radio bearer and notifying the user terminal to release the radio bearer.

Optionally, the operation of receiving the CN flow identifier and the information on the corresponding QoS parameter of the PDN connection as transmitted from the CN control network element includes: receiving an initial UE context setup request message as transmitted from the CN control network element and acquiring the CN flow identifier and the information on the corresponding QoS parameter of the PDN connection from the initial UE context setup request message.

Optionally, the operation of transmitting the information on the mapping relation between the existing radio bearer or the new radio bearer and the new CN flow identifier of the PDN connection to the user terminal includes: transmitting to the user terminal a Radio Resource Control (RRC) reconfiguration request message carrying the information on the mapping relation between the existing radio bearer or the new radio bearer and the new CN flow identifier of the PDN connection.

According to an embodiment of the present disclosure, a method applied in a Core Network (CN) control network element for control of Quality of Service (QoS) is provided. The method includes: transmitting a Core Network (CN) flow identifier and information on a corresponding uplink data flow characteristic of a Packet Data Network (PDN) connection to a user terminal and transmitting the CN flow identifier and information on a corresponding downlink data flow characteristic of the PDN connection to a CN gateway; and transmitting the CN flow identifier and information on a corresponding QoS parameter of the PDN connection to a base station.

Optionally, the method further includes: transmitting the CN flow identifier and the information on the corresponding uplink data flow characteristic of the PDN connection to the CN gateway.

According to an embodiment of the present disclosure, a method applied in a Core Network (CN) gateway for control of Quality of Service (QoS) is provided. The method includes: creating, after receiving a Core Network (CN) flow identifier and information on a corresponding downlink data flow characteristic of a Packet Data Network (PDN) connection as transmitted from a CN control network element, a mapping relation between the CN flow identifier and the corresponding downlink data flow characteristic; and transmitting data packets to a user terminal, among which a data packet satisfying the downlink data flow characteristic carries the CN flow identifier corresponding to the downlink data flow characteristic.

Optionally, the method further includes: creating, after receiving the CN flow identifier and information on a corresponding uplink data flow characteristic of the PDN connection as transmitted from the CN control network element, a mapping relation between the CN flow identifier and the corresponding uplink data flow characteristic.

Optionally, the method further includes: applying, after receiving a data packet carrying a CN flow identifier from the user terminal, a bearer verification to the data packet based on the mapping relation between the CN flow identifier and the corresponding uplink data flow characteristic, and forwarding the data packet when the verification succeeds.

According to an embodiment of the present disclosure, a method applied in a user terminal for control of Quality of Service (QoS) is provided. The method includes: creating, after receiving a Core Network (CN) flow identifier and information on a corresponding radio bearer of a Packet Data Network (PDN) connection as transmitted from a base station, a mapping relation between the CN flow identifier and the corresponding radio bearer; creating, after receiving the CN flow identifier and information on a corresponding uplink data flow characteristic of the PDN connection as transmitted from a CN gateway, a mapping relation between the CN flow identifier and the corresponding uplink data flow characteristic; and transmitting data packets, among which a data packet satisfying the uplink data flow characteristic carries the CN flow identifier corresponding to the uplink data flow characteristic.

Optionally, the method further includes: saving, after receiving a mapping relation between a new radio bearer or an existing radio bearer and a new CN flow identifier as transmitted from the base station, the mapping relation between the new CN flow identifier and the corresponding radio bearer; or releasing, after receiving information on a CN flow identifier to be released as transmitted from the base station, a mapping relation between the CN flow identifier to be released and a corresponding radio bearer; or updating, after receiving an updated mapping relation between the CN flow identifier to be released and the radio bearer as transmitted from the base station, a saved mapping relation between the CN flow identifier and the corresponding radio bearer.

According to an embodiment of the present disclosure, an apparatus applied in a base station for control of Quality of Service (QoS) is provided. The apparatus includes: an information receiving and processing module configured to receive a Core Network (CN) flow identifier and information on a corresponding QoS parameter of a Packet Data Network (PDN) connection as transmitted from a CN control network element and create a mapping relation between the CN flow identifier and the corresponding QoS parameter; and a radio bearer processing module configured to utilize, after determining based on the received information on the QoS parameter of the PDN connection that a radio bearer satisfying a requirement of the QoS parameter exists between a user terminal and the base station, the existing radio bearer satisfying the requirement of the QoS parameter, create a mapping relation between the existing radio bearer and the CN flow identifier of the PDN connection and transmit information on the mapping relation to the user terminal.

Optionally, the radio bearer processing module is further configured to: establish a new radio bearer between the user terminal and the base station after determining based on the received information on the QoS parameter of the PDN connection that no radio bearer satisfying the requirement of the QoS parameter exists between the user terminal and the base station, create a mapping relation between the established new radio bearer and the CN flow identifier of the PDN connection and transmit information on the mapping relation to the user terminal.

Optionally, the apparatus further includes a data forwarding module configured to: verify, after receiving an uplink data packet carrying a CN flow identifier from the user terminal over a radio bearer, a binding relation between the CN flow identifier and the radio bearer, and transmit the data packet to a CN gateway when the binding relation is successfully verified; and determine, after receiving a downlink data packet carrying a CN flow identifier from the CN gateway, a radio bearer corresponding to the user terminal based on the CN flow identifier, and transmit the data packet to the user terminal over the determined radio bearer.

Optionally, the information receiving and processing module is further configured to create, after receiving a new CN flow identifier and information on a corresponding QoS parameter as transmitted from the CN control network element, a mapping relation between the new CN flow identifier and the corresponding QoS parameter and notify the radio bearer processing module to operate accordingly. The radio bearer processing module is further configured to determine whether a radio bearer satisfying a requirement of the QoS parameter exists between the user terminal and the base station and, if so, utilize the existing radio bearer satisfying the requirement of the QoS parameter and create a mapping relation between the existing radio bearer and the new CN flow identifier; or otherwise establish a new radio bearer between the user terminal and the base station and create a mapping relation between the new radio bearer and the new CN flow identifier; and transmit information on the mapping relation between the existing radio bearer or the new radio bearer and the new CN flow identifier to the user terminal.

Optionally, the information receiving and processing module is further configured to determine, after receiving information on a CN flow identifier to be released as transmitted from the CN control network element, a radio bearer corresponding to the CN flow identifier to be released, release a mapping relation between the CN flow identifier to be released and the corresponding radio bearer and notify the radio bearer processing module to operate accordingly. The radio bearer processing module is further configured to transmit information on the CN flow identifier to be released to the user terminal.

Optionally, the information receiving and processing module is further configured to create, after receiving the CN flow identifier and information on a corresponding new QoS parameter, a mapping relation between the CN flow identifier and the new QoS parameter and notify the radio bearer processing module to operate accordingly. The radio bearer processing module is further configured to: continue to utilize the existing radio bearer when the radio bearer to which the CN flow identifier is mapped satisfies a requirement of the new QoS parameter; or utilize, when the radio bearer to which the CN flow identifier is mapped does not satisfy the requirement of the new QoS parameter and another radio bearer satisfying the requirement of the new QoS parameter exists between the user terminal and the base station, the other radio bearer, modify the mapping relation between the CN flow identifier and the radio bearer and transmit information on the modified mapping relation between the CN flow identifier and the radio bearer to the user terminal; or establish a new radio bearer between the user terminal and the base station when the radio bearer to which the CN flow identifier is mapped does not satisfy the requirement of the new QoS parameter and no radio bearer satisfying the requirement of the new QoS parameter exists between the user terminal and the base station, modify the mapping relation between the CN flow identifier and the radio bearer and transmit information on the modified mapping relation between the CN flow identifier and the radio bearer to the user terminal.

Optionally, the radio bearer processing module is further configured to: release, when the existing radio bearer is not mapped to any CN flow identifier, the radio bearer and notify the user terminal to release the radio bearer.

Optionally, the information receiving and processing module is configured to receive the CN flow identifier and the information on the corresponding QoS parameter of the PDN connection as transmitted from the CN control network element by: receiving an initial UE context setup request message as transmitted from the CN control network element and acquiring the CN flow identifier and the information on the corresponding QoS parameter of the PDN connection from the initial UE context setup request message.

Optionally, the radio bearer processing module is configured to transmit the information on the mapping relation between the existing radio bearer or the new radio bearer and the new CN flow identifier of the PDN connection to the user terminal by: transmitting to the user terminal a Radio Resource Control (RRC) reconfiguration request message carrying the information on the mapping relation between the existing radio bearer or the new radio bearer and the new CN flow identifier of the PDN connection.

According to an embodiment of the present disclosure, an apparatus applied in a Core Network (CN) control network element for control of Quality of Service (QoS) is provided. The apparatus includes: a first transmitting module configured to transmit a Core Network (CN) flow identifier and information on a corresponding uplink data flow characteristic of a Packet Data Network (PDN) connection to a user terminal and transmit the CN flow identifier and information on a corresponding downlink data flow characteristic of the PDN connection to a CN gateway; and a second transmitting module configured to transmit the CN flow identifier and information on a corresponding QoS parameter of the PDN connection to a base station.

Optionally, the first transmitting module is further configured to: transmit the CN flow identifier and the information on the corresponding uplink data flow characteristic of the PDN connection to the CN gateway.

According to an embodiment of the present disclosure, an apparatus applied in a Core Network (CN) gateway for control of Quality of Service (QoS) is provided. The apparatus includes: an information receiving and processing module configured to create, after receiving a Core Network (CN) flow identifier and information on a corresponding downlink data flow characteristic of a Packet Data Network (PDN) connection as transmitted from a CN control network element, a mapping relation between the CN flow identifier and the corresponding downlink data flow characteristic; and a data transmitting module configured to transmit data packets to a user terminal, among which a data packet satisfying the downlink data flow characteristic carries the CN flow identifier corresponding to the downlink data flow characteristic.

Optionally, the information receiving and processing module is further configured to: create, after receiving the CN flow identifier and information on a corresponding uplink data flow characteristic of the PDN connection as transmitted from the CN control network element, a mapping relation between the CN flow identifier and the corresponding uplink data flow characteristic.

Optionally, the apparatus further includes: a data forwarding module configured to apply, after receiving a data packet carrying a CN flow identifier from the user terminal, a bearer verification to the data packet based on the mapping relation between the CN flow identifier and the corresponding uplink data flow characteristic, and forward the data packet when the verification succeeds.

According to an embodiment of the present disclosure, an apparatus applied in a user terminal for control of Quality of Service (QoS) is provided. The apparatus includes: a first information receiving and processing module configured to create, after receiving a Core Network (CN) flow identifier and information on a corresponding radio bearer of a Packet Data Network (PDN) connection as transmitted from a base station, a mapping relation between the CN flow identifier and the corresponding radio bearer; a second information receiving and processing module configured to create, after receiving the CN flow identifier and information on a corresponding uplink data flow characteristic of the PDN connection as transmitted from a CN gateway, a mapping relation between the CN flow identifier and the corresponding uplink data flow characteristic; and a data transmitting module configured to transmit data packets, among which a data packet satisfying the uplink data flow characteristic carries the CN flow identifier corresponding to the uplink data flow characteristic.

Optionally, the first information receiving and processing module is further configured to: save, after receiving a mapping relation between a new radio bearer or an existing radio bearer and a new CN flow identifier as transmitted from the base station, the mapping relation between the new CN flow identifier and the corresponding radio bearer; or release, after receiving information on a CN flow identifier to be released as transmitted from the base station, a mapping relation between the CN flow identifier to be released and a corresponding radio bearer; or update, after receiving an updated mapping relation between the CN flow identifier to be released and the radio bearer as transmitted from the base station, a saved mapping relation between the CN flow identifier and the corresponding radio bearer.

According to an embodiment of the present disclosure, a computer readable storage medium is provided. The computer readable storage medium stores computer executable instructions which, when executed by a processor, perform the above methods.

Compared with the related art, the embodiments of the present disclosure provide methods and apparatus for control of QoS. A base station receives a CN flow identifier and information on a corresponding QoS parameter of a Packet Data Network (PDN) connection as transmitted from a CN control network element and creates a mapping relation between the CN flow identifier and the corresponding QoS parameter. The base station determines whether a radio bearer satisfying a requirement of the QoS parameter exists between a user terminal and the base station and, if so, utilizes the existing radio bearer satisfying the requirement of the QoS parameter, or otherwise establishes a new radio bearer between the user terminal and the base station. The base station transmits a mapping relation between the existing radio bearer or the new radio bearer and the CN flow identifier to the user terminal. With the present disclosure, a radio bearer can be shared across PDN connections. The base station can autonomously decide whether to establish a radio bearer. In this way, the accuracy of QoS control can be improved and resources over the air interface can be saved.

Other aspects can be understood from the figures and the detailed description.

DETAILED DESCRIPTION OF THE EMBODIMENTS

In the following, the embodiments of the present disclosure will be described in detail with reference to the figures.

The embodiments, and the features thereof, can be combined with each other, provided that they do not conflict.

Embodiment 1

Figure 1:
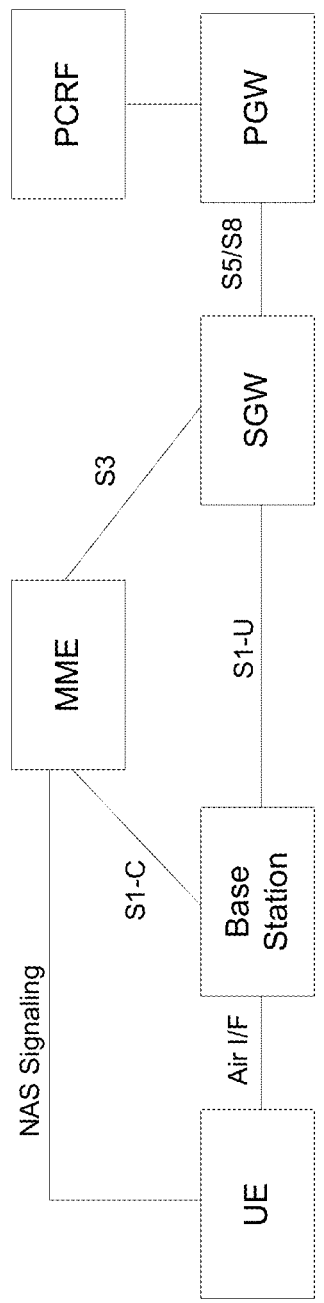
FIG. 1 is a schematic diagram showing relevant network elements in a QoS solution in a 4G system in the related art.
Figure 2:
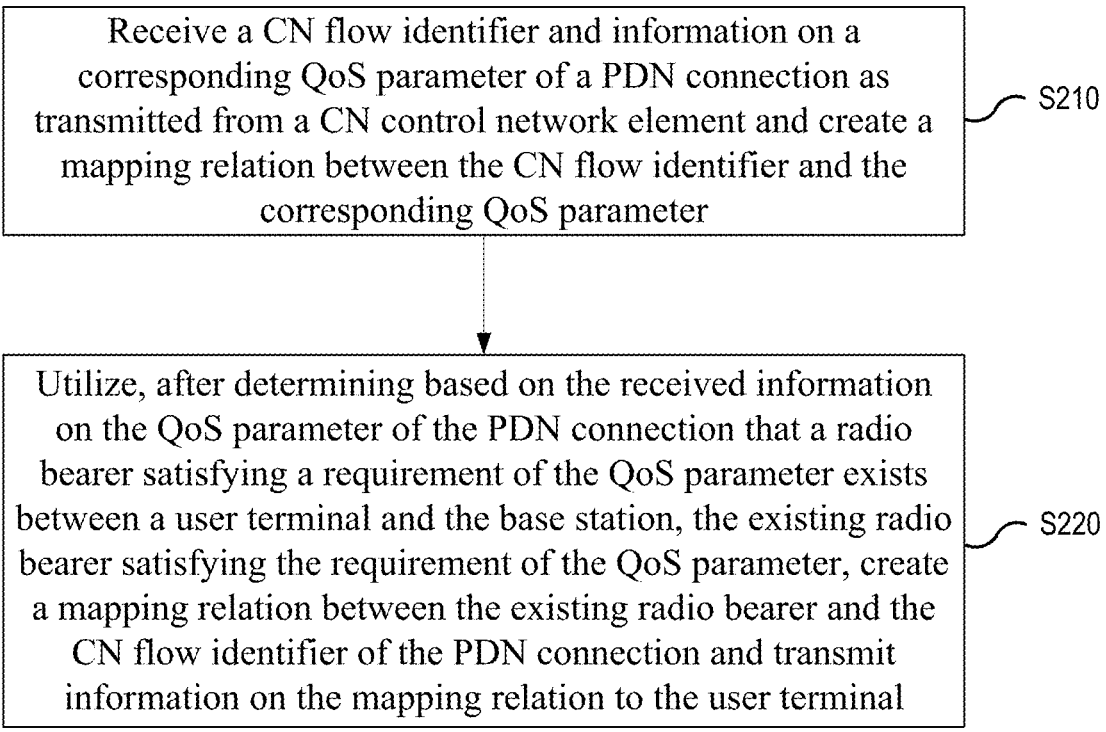
FIG. 2 is a flowchart illustrating a method for control of QoS (in a base station) according to Embodiment 1 of the present disclosure.

As shown in FIG. 2, Embodiment 1 of the present disclosure provides a method for control of QoS. The method is applied in a base station and includes:

S210: receiving a CN flow identifier and information on a corresponding QoS parameter of a PDN connection as transmitted from a CN control network element and creating a mapping relation between the CN flow identifier and the corresponding QoS parameter; and S220: utilizing, after determining based on the received information on the QoS parameter of the PDN connection that a radio bearer satisfying a requirement of the QoS parameter exists between a user terminal and the base station, the existing radio bearer satisfying the requirement of the QoS parameter, creating a mapping relation between the existing radio bearer and the CN flow identifier of the PDN connection and transmitting information on the mapping relation to the user terminal.

Here, the operation of receiving the CN flow identifier and the information on the corresponding QoS parameter of the PDN connection as transmitted from the CN control network element can include: receiving an initial UE context setup request message as transmitted from the CN control network element and acquiring the CN flow identifier and the information on the corresponding QoS parameter of the PDN connection from the initial UE context setup request message.

Here, the method can further include: establishing a new radio bearer between the user terminal and the base station after determining based on the received information on the QoS parameter of the PDN connection that no radio bearer satisfying the requirement of the QoS parameter exists between the user terminal and the base station, creating a mapping relation between the established new radio bearer and the CN flow identifier of the PDN connection and transmitting information on the mapping relation to the user terminal.

Here, the operation of transmitting the information on the mapping relation between the existing radio bearer or the new radio bearer and the new CN flow identifier of the PDN connection to the user terminal can include: transmitting to the user terminal a Radio Resource Control (RRC) reconfiguration request message carrying the information on the mapping relation between the existing radio bearer or the new radio bearer and the new CN flow identifier of the PDN connection.

Here, the method can further include:

verifying, after receiving an uplink data packet carrying a CN flow identifier from the user terminal over a radio bearer, a binding relation between the CN flow identifier and the radio bearer, and transmitting the data packet to a CN gateway when the binding relation is successfully verified; and determining, after receiving a downlink data packet carrying a CN flow identifier from the CN gateway, a radio bearer corresponding to the user terminal based on the CN flow identifier, and transmitting the data packet to the user terminal over the determined radio bearer.

Here, the method can further include:

creating, after receiving a new CN flow identifier and information on a corresponding QoS parameter as transmitted from the CN control network element, a mapping relation between the new CN flow identifier and the corresponding QoS parameter;

determining whether a radio bearer satisfying a requirement of the QoS parameter exists between the user terminal and the base station and, if so, utilizing the existing radio bearer satisfying the requirement of the QoS parameter and creating a mapping relation between the existing radio bearer and the new CN flow identifier; or otherwise establishing a new radio bearer between the user terminal and the base station and creating a mapping relation between the new radio bearer and the new CN flow identifier; and transmitting information on the mapping relation between the existing radio bearer or the new radio bearer and the new CN flow identifier to the user terminal.

Here, the method can further include:

determining, after receiving information on a CN flow identifier to be released as transmitted from the CN control network element, a radio bearer corresponding to the CN flow identifier to be released and releasing a mapping relation between the CN flow identifier to be released and the corresponding radio bearer; and transmitting information on the CN flow identifier to be released to the user terminal.

Here, the method can further include:

creating, after receiving the CN flow identifier and information on a corresponding new QoS parameter, a mapping relation between the CN flow identifier and the new QoS parameter;

continuing to utilize the existing radio bearer when the radio bearer to which the CN flow identifier is mapped satisfies a requirement of the new QoS parameter; or utilizing, when the radio bearer to which the CN flow identifier is mapped does not satisfy the requirement of the new QoS parameter and another radio bearer satisfying the requirement of the new QoS parameter exists between the user terminal and the base station, the other radio bearer, modifying the mapping relation between the CN flow identifier and the radio bearer and transmitting information on the modified mapping relation between the CN flow identifier and the radio bearer to the user terminal; or establishing a new radio bearer between the user terminal and the base station when the radio bearer to which the CN flow identifier is mapped does not satisfy the requirement of the new QoS parameter and no radio bearer satisfying the requirement of the new QoS parameter exists between the user terminal and the base station, modifying the mapping relation between the CN flow identifier and the radio bearer and transmitting information on the modified mapping relation between the CN flow identifier and the radio bearer to the user terminal.

Here, the method can further include: releasing, when the existing radio bearer is not mapped to any CN flow identifier, the radio bearer and notifying the user terminal to release the radio bearer.

Embodiment 2

Figure 3:
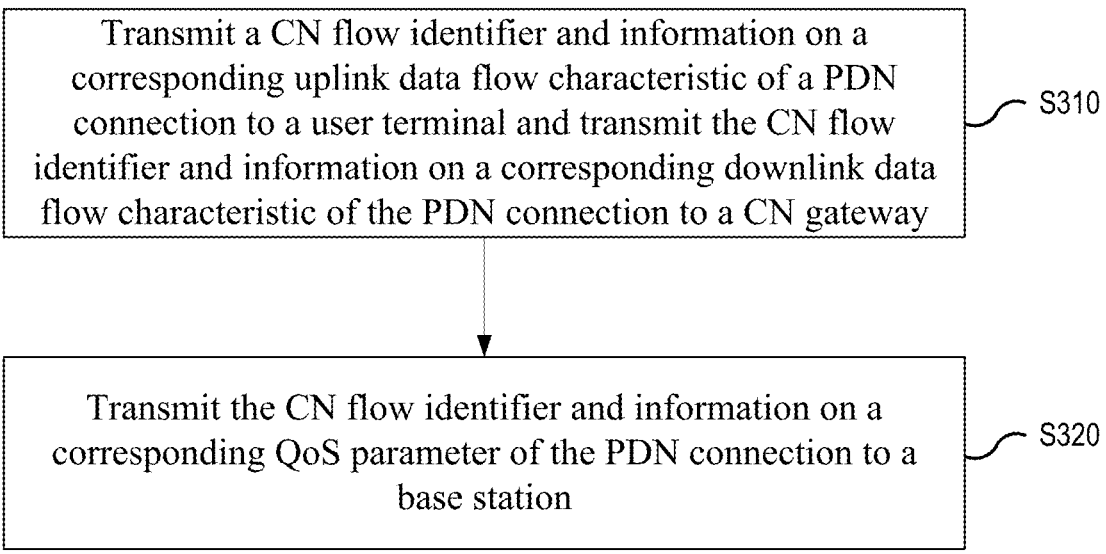
FIG. 3 is a flowchart illustrating a method for control of QoS (in a CN control network element) according to Embodiment 2 of the present disclosure.

As shown in FIG. 3, Embodiment 2 of the present disclosure provides a method for control of QoS. The method is applied in a CN control network element and includes:

S310: transmitting a CN flow identifier and information on a corresponding uplink data flow characteristic of a PDN connection to a user terminal and transmitting the CN flow identifier and information on a corresponding downlink data flow characteristic of the PDN connection to a CN gateway; and S320: transmitting the CN flow identifier and information on a corresponding QoS parameter of the PDN connection to a base station.

Here, the method can further include: transmitting the CN flow identifier and the information on the corresponding uplink data flow characteristic of the PDN connection to the CN gateway.

Embodiment 3

Figure 4:
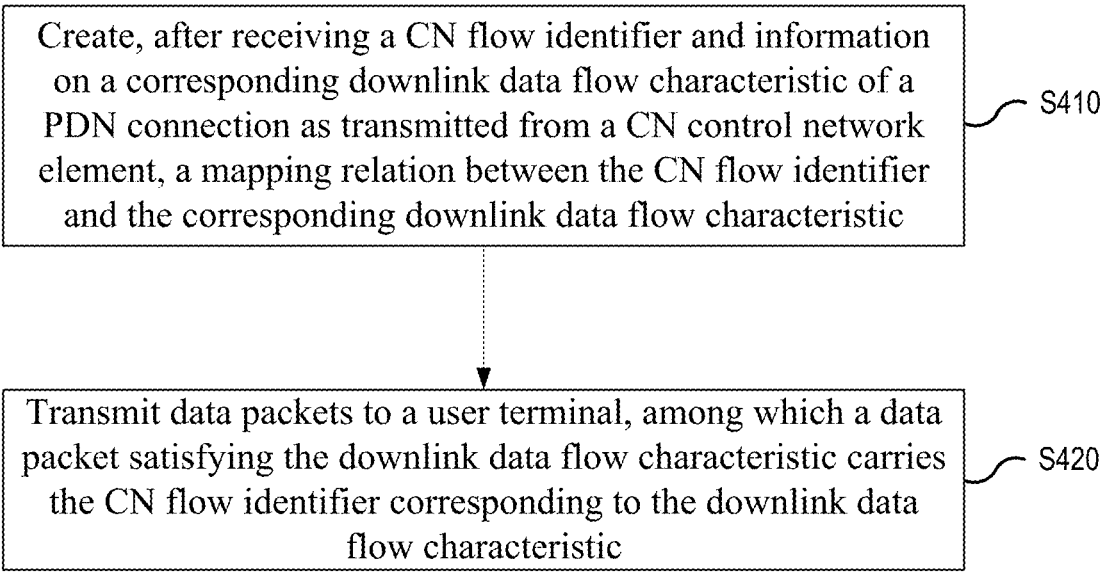
FIG. 4 is a flowchart illustrating a method for control of QoS (in a CN gateway) according to Embodiment 3 of the present disclosure.

As shown in FIG. 4, Embodiment 3 of the present disclosure provides a method for control of QoS. The method is applied in a CN gateway and includes:

S410: creating, after receiving a CN flow identifier and information on a corresponding downlink data flow characteristic of a PDN connection as transmitted from a CN control network element, a mapping relation between the CN flow identifier and the corresponding downlink data flow characteristic; and S420: transmitting data packets to a user terminal, among which a data packet satisfying the downlink data flow characteristic carries the CN flow identifier corresponding to the downlink data flow characteristic.

Here, the method can further include: creating, after receiving the CN flow identifier and information on a corresponding uplink data flow characteristic of the PDN connection as transmitted from the CN control network element, a mapping relation between the CN flow identifier and the corresponding uplink data flow characteristic.

Here, the method can further include: applying, after receiving a data packet carrying a CN flow identifier from the user terminal, a bearer verification to the data packet based on the mapping relation between the CN flow identifier and the corresponding uplink data flow characteristic, and forwarding the data packet when the verification succeeds.

Embodiment 4

Figure 5:
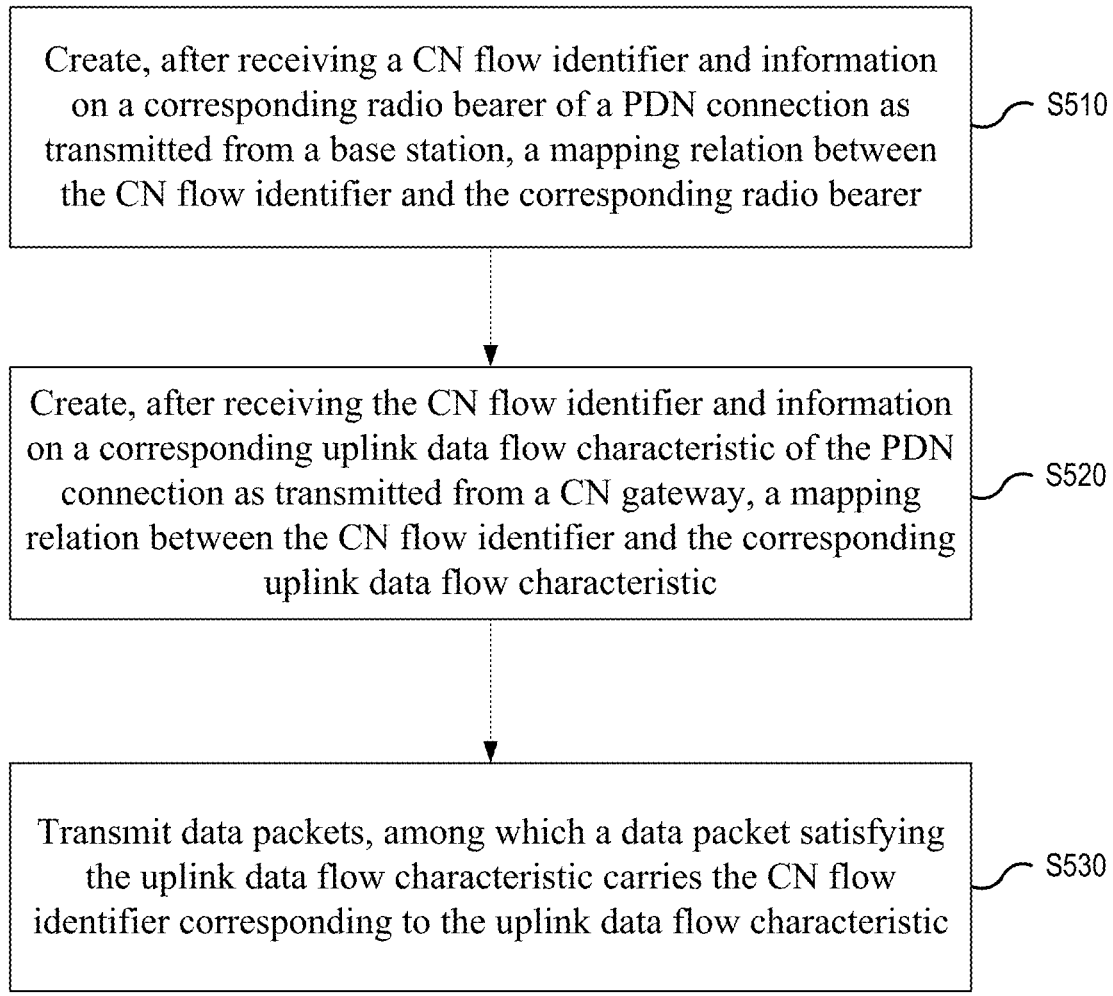
FIG. 5 is a flowchart illustrating a method for control of QoS (in a terminal) according to Embodiment 4 of the present disclosure.

As shown in FIG. 5, Embodiment 4 of the present disclosure provides a method for control of QoS. The method is applied in a user terminal and includes:

S510: creating, after receiving a CN flow identifier and information on a corresponding radio bearer of a PDN connection as transmitted from a base station, a mapping relation between the CN flow identifier and the corresponding radio bearer;

S520: creating, after receiving the CN flow identifier and information on a corresponding uplink data flow characteristic of the PDN connection as transmitted from a CN gateway, a mapping relation between the CN flow identifier and the corresponding uplink data flow characteristic; and S530: transmitting data packets, among which a data packet satisfying the uplink data flow characteristic carries the CN flow identifier corresponding to the uplink data flow characteristic.

Here, the method can further include: saving, after receiving a mapping relation between a new radio bearer or an existing radio bearer and a new CN flow identifier as transmitted from the base station, the mapping relation between the new CN flow identifier and the corresponding radio bearer.

Here, the method can further include: releasing, after receiving information on a CN flow identifier to be released as transmitted from the base station, a mapping relation between the CN flow identifier to be released and a corresponding radio bearer.

Here, the method can further include: updating, after receiving an updated mapping relation between the CN flow identifier to be released and the radio bearer as transmitted from the base station, a saved mapping relation between the CN flow identifier and the corresponding radio bearer.

Embodiment 5

Figure 6:
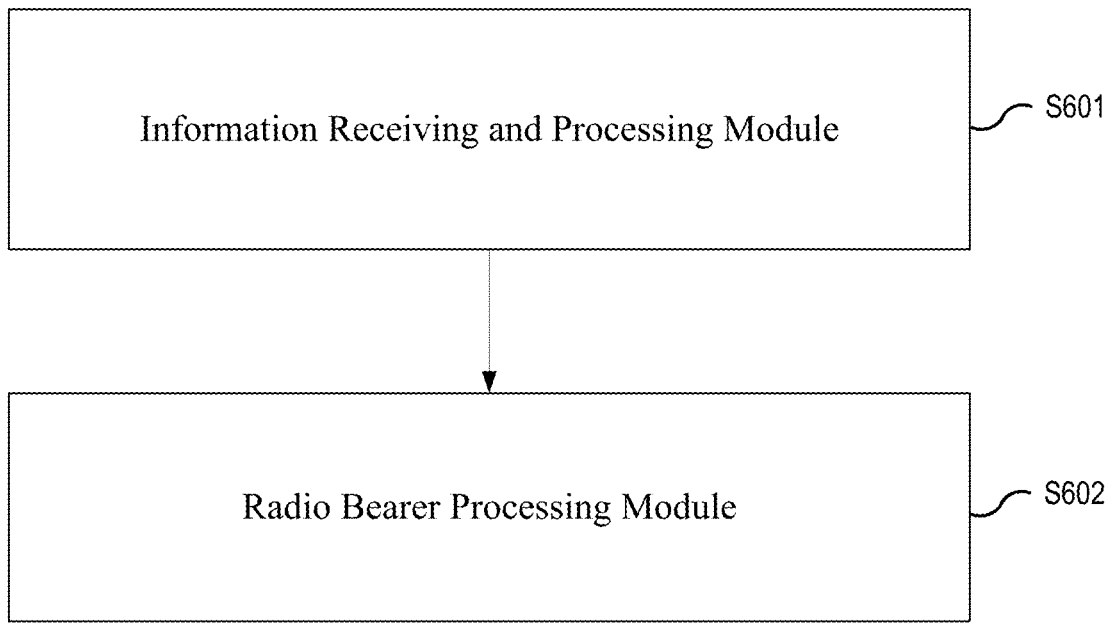
FIG. 6 is a flowchart illustrating an apparatus for control of QoS (in a base station) according to Embodiment 5 of the present disclosure.

As shown in FIG. 6, Embodiment 5 of the present disclosure provides an apparatus for control of QoS. The apparatus is applied in a base station and includes:

an information receiving and processing module 601 configured to receive a CN flow identifier and information on a corresponding QoS parameter of a PDN connection as transmitted from a CN control network element and create a mapping relation between the CN flow identifier and the corresponding QoS parameter; and a radio bearer processing module 602 configured to utilize, after determining based on the received information on the QoS parameter of the PDN connection that a radio bearer satisfying a requirement of the QoS parameter exists between a user terminal and the base station, the existing radio bearer satisfying the requirement of the QoS parameter, create a mapping relation between the existing radio bearer and the CN flow identifier of the PDN connection and transmit information on the mapping relation to the user terminal.

Here, the radio bearer processing module 602 can be further configured to: establish a new radio bearer between the user terminal and the base station after determining based on the received information on the QoS parameter of the PDN connection that no radio bearer satisfying the requirement of the QoS parameter exists between the user terminal and the base station, create a mapping relation between the established new radio bearer and the CN flow identifier of the PDN connection and transmit information on the mapping relation to the user terminal.

Here, the apparatus can further include: a data forwarding module 603 configured to verify, after receiving an uplink data packet carrying a CN flow identifier from the user terminal over a radio bearer, a binding relation between the CN flow identifier and the radio bearer, and transmit the data packet to a CN gateway when the binding relation is successfully verified; and determine, after receiving a downlink data packet carrying a CN flow identifier from the CN gateway, a radio bearer corresponding to the user terminal based on the CN flow identifier, and transmit the data packet to the user terminal over the determined radio bearer.

Here, the information receiving and processing module 601 can be further configured to create, after receiving a new CN flow identifier and information on a corresponding QoS parameter as transmitted from the CN control network element, a mapping relation between the new CN flow identifier and the corresponding QoS parameter and notify the radio bearer processing module to operate accordingly. The radio bearer processing module 602 can be further configured to determine whether a radio bearer satisfying a requirement of the QoS parameter exists between the user terminal and the base station and, if so, utilize the existing radio bearer satisfying the requirement of the QoS parameter and create a mapping relation between the existing radio bearer and the new CN flow identifier; or otherwise establish a new radio bearer between the user terminal and the base station and create a mapping relation between the new radio bearer and the new CN flow identifier; and transmit information on the mapping relation between the existing radio bearer or the new radio bearer and the new CN flow identifier to the user terminal.

Here, the radio bearer processing module 601 can be further configured to determine, after receiving information on a CN flow identifier to be released as transmitted from the CN control network element, a radio bearer corresponding to the CN flow identifier to be released, release a mapping relation between the CN flow identifier to be released and the corresponding radio bearer and notify the radio bearer processing module to operate accordingly. The radio bearer processing module 602 can be further configured to transmit information on the CN flow identifier to be released to the user terminal.

Here, the information receiving and processing module 601 can be further configured to create, after receiving the CN flow identifier and information on a corresponding new QoS parameter, a mapping relation between the CN flow identifier and the new QoS parameter and notify the radio bearer processing module to operate accordingly. The radio bearer processing module 602 can be further configured to:

continue to utilize the existing radio bearer when the radio bearer to which the CN flow identifier is mapped satisfies a requirement of the new QoS parameter; or utilize, when the radio bearer to which the CN flow identifier is mapped does not satisfy the requirement of the new QoS parameter and another radio bearer satisfying the requirement of the new QoS parameter exists between the user terminal and the base station, the other radio bearer, modify the mapping relation between the CN flow identifier and the radio bearer and transmit information on the modified mapping relation between the CN flow identifier and the radio bearer to the user terminal; or establish a new radio bearer between the user terminal and the base station when the radio bearer to which the CN flow identifier is mapped does not satisfy the requirement of the new QoS parameter and no radio bearer satisfying the requirement of the new QoS parameter exists between the user terminal and the base station, modify the mapping relation between the CN flow identifier and the radio bearer and transmit information on the modified mapping relation between the CN flow identifier and the radio bearer to the user terminal.

Here, the radio bearer processing module 602 can be further configured to release, when the existing radio bearer is not mapped to any CN flow identifier, the radio bearer and notify the user terminal to release the radio bearer.

Here, the information receiving and processing module 601 can be configured to receive the CN flow identifier and the information on the corresponding QoS parameter of the PDN connection as transmitted from the CN control network element by: receiving an initial UE context setup request message as transmitted from the CN control network element and acquiring the CN flow identifier and the information on the corresponding QoS parameter of the PDN connection from the initial UE context setup request message.

Here, the radio bearer processing module 602 can be configured to transmit the information on the mapping relation between the existing radio bearer or the new radio bearer and the new CN flow identifier of the PDN connection to the user terminal by: transmitting to the user terminal a Radio Resource Control (RRC) reconfiguration request message carrying the information on the mapping relation between the existing radio bearer or the new radio bearer and the new CN flow identifier of the PDN connection.

Embodiment 6

Figure 7:
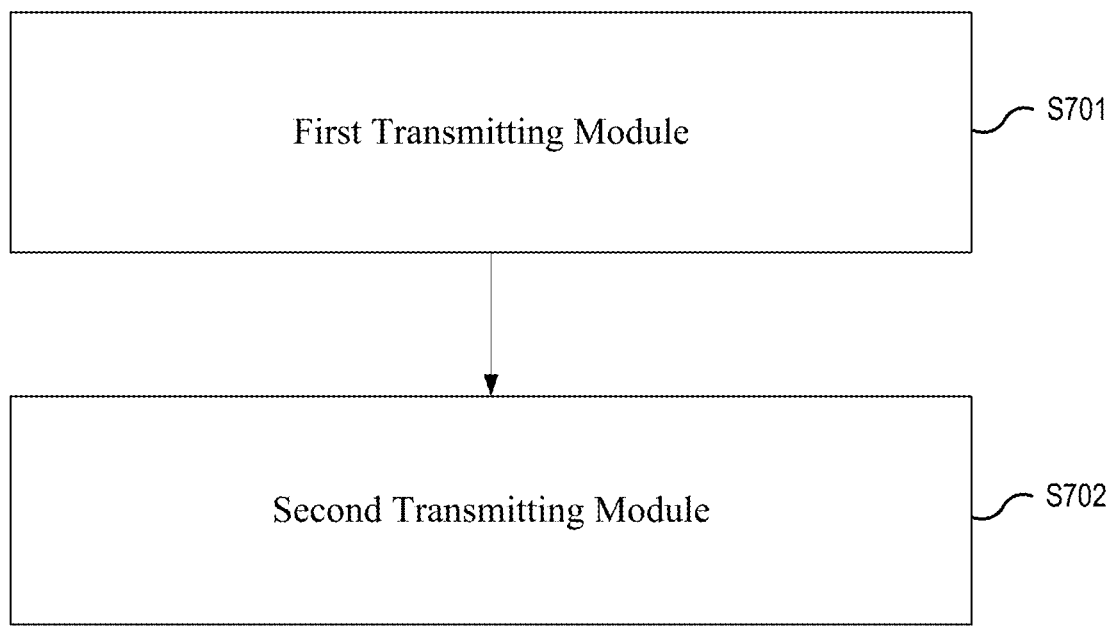
FIG. 7 is a flowchart illustrating an apparatus for control of QoS (in a CN control network element) according to Embodiment 6 of the present disclosure.

As shown in FIG. 7, Embodiment 6 of the present disclosure provides an apparatus for control of QoS. The apparatus is applied in a CN control network element and includes:

a first transmitting module 701 configured to transmit a CN flow identifier and information on a corresponding uplink data flow characteristic of a PDN connection to a user terminal and transmit the CN flow identifier and information on a corresponding downlink data flow characteristic of the PDN connection to a CN gateway; and a second transmitting module 702 configured to transmit the CN flow identifier and information on a corresponding QoS parameter of the PDN connection to a base station.

Here, the first transmitting module 701 can be further configured to transmit the CN flow identifier and the information on the corresponding uplink data flow characteristic of the PDN connection to the CN gateway.

Embodiment 7

Figure 8:
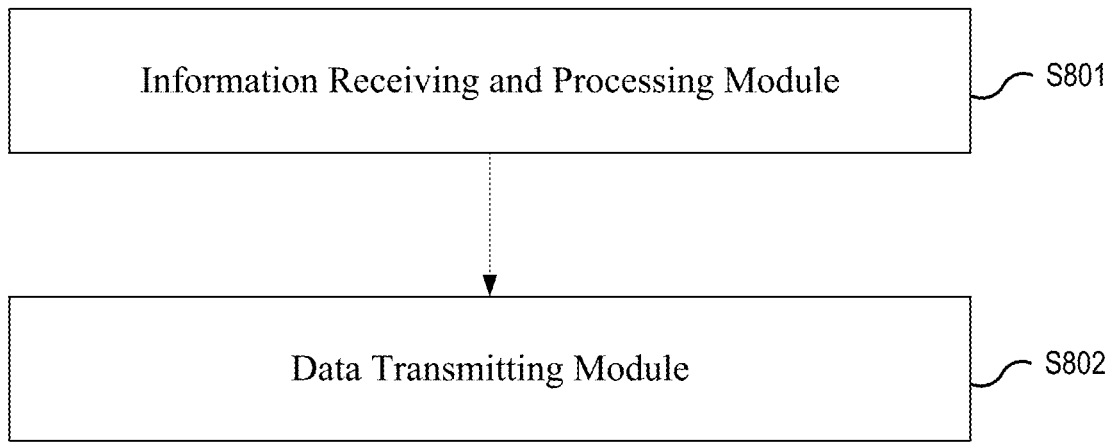
FIG. 8 is a flowchart illustrating an apparatus for control of QoS (in a CN gateway) according to Embodiment 7 of the present disclosure.

As shown in FIG. 8, Embodiment 7 of the present disclosure provides an apparatus for control of QoS. The apparatus is applied in a CN gateway and includes:

an information receiving and processing module 801 configured to create, after receiving a CN flow identifier and information on a corresponding downlink data flow characteristic of a PDN connection as transmitted from a CN control network element, a mapping relation between the CN flow identifier and the corresponding downlink data flow characteristic; and a data transmitting module 802 configured to transmit data packets to a user terminal, among which a data packet satisfying the downlink data flow characteristic carries the CN flow identifier corresponding to the downlink data flow characteristic.

Here, the information receiving and processing module 801 can be further configured to: create, after receiving the CN flow identifier and information on a corresponding uplink data flow characteristic of the PDN connection as transmitted from the CN control network element, a mapping relation between the CN flow identifier and the corresponding uplink data flow characteristic.

Here, the apparatus can further includes a data forwarding module 803 configured to apply, after receiving a data packet carrying a CN flow identifier from the user terminal, a bearer verification to the data packet based on the mapping relation between the CN flow identifier and the corresponding uplink data flow characteristic, and forward the data packet when the verification succeeds.

Embodiment 8

Figure 9:
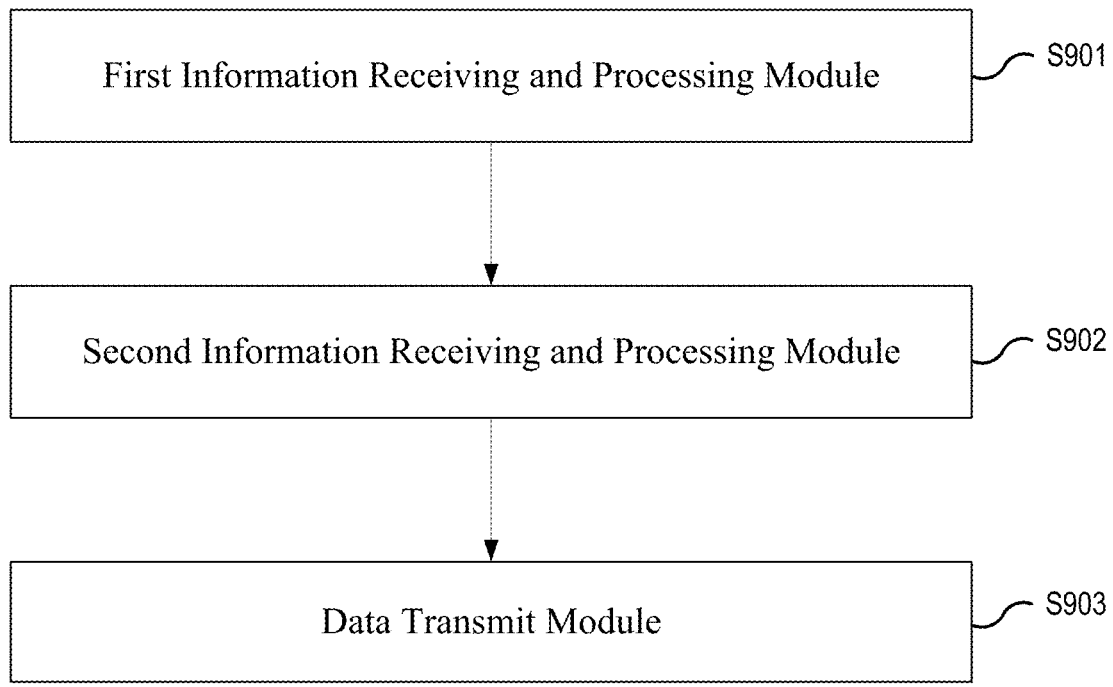
FIG. 9 is a flowchart illustrating an apparatus for control of QoS (in a terminal) according to Embodiment 8 of the present disclosure.

As shown in FIG. 9, Embodiment 8 of the present disclosure provides an apparatus for control of QoS. The apparatus is applied in a user terminal and includes:

a first information receiving and processing module 901 configured to create, after receiving a CN flow identifier and information on a corresponding radio bearer of a PDN connection as transmitted from a base station, a mapping relation between the CN flow identifier and the corresponding radio bearer;

a second information receiving and processing module 902 configured to create, after receiving the CN flow identifier and information on a corresponding uplink data flow characteristic of the PDN connection as transmitted from a CN gateway, a mapping relation between the CN flow identifier and the corresponding uplink data flow characteristic; and a data transmitting module 903 configured to transmit data packets, among which a data packet satisfying the uplink data flow characteristic carries the CN flow identifier corresponding to the uplink data flow characteristic.

Here, the first information receiving and processing module 901 can be further configured to:

save, after receiving a mapping relation between a new radio bearer or an existing radio bearer and a new CN flow identifier as transmitted from the base station, the mapping relation between the new CN flow identifier and the corresponding radio bearer; or release, after receiving information on a CN flow identifier to be released as transmitted from the base station, a mapping relation between the CN flow identifier to be released and a corresponding radio bearer; or update, after receiving an updated mapping relation between the CN flow identifier to be released and the radio bearer as transmitted from the base station, a saved mapping relation between the CN flow identifier and the corresponding radio bearer.

Embodiment 9

The method according to Embodiment 1 of the present disclosure can be implemented in an electronic device such as a base station. The method according to Embodiment 2 of the present disclosure can be implemented in an electronic device such as a CN control network element. The method according to Embodiment 3 of the present disclosure can be implemented in an electronic device such as a CN gateway. The method according to Embodiment 4 of the present disclosure can be implemented in an electronic device such as a user terminal.

Figure 10:
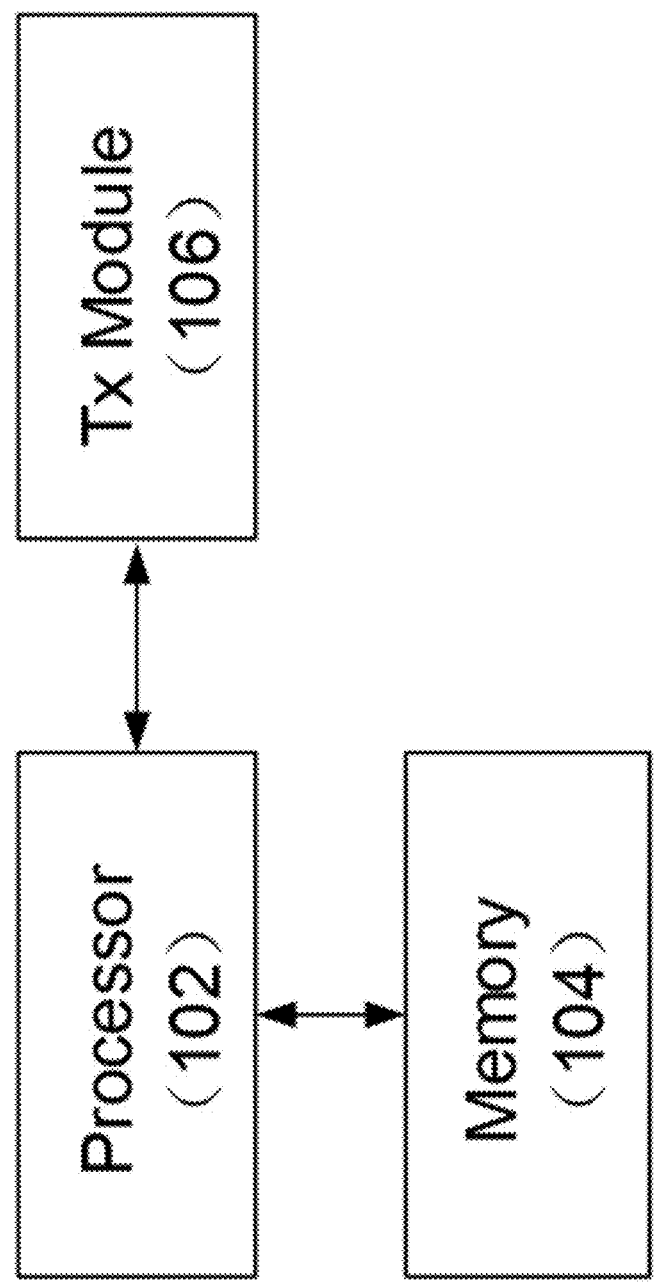
FIG. 10 is a schematic diagram showing a structure of an electronic device according to Embodiment 9 of the present disclosure.

As shown in FIG. 10, an electronic device 10 may include one or more (only one is shown) processors 102 (which can include, but not limited to, processing devices such as a microprocessor (e.g., Micro Controller Unit, or MCU) or a programmable logic device (e.g., Field Programmable Gate Array, or FPGA)), a memory 104 for storing data, and a transmission module 106 for providing communication functions. It can be appreciated by those skilled in the art that the structure shown in FIG. 10 is illustrative only and the structure of the above electronic device is not limited to this. For example, the electronic device 10 may include more or less components than those shown in FIG. 10, or have a different configuration than the one shown in FIG. 10.

The memory 104 can store software programs and modules for application software, e.g., program instructions/ module corresponding to the methods for control of QoS according to the embodiments of the present disclosure. The processor 102 executes the software programs and modules stored in the memory 104 to execute various functional applications and data processing, i.e., to perform the above methods. The memory 104 may include a cache or a non-volatile memory, such as one or more magnetic storage devices, flash memories, or non-volatile solid-state memories. In some instances, the memory 104 can further include a memory that is remote from the processor 102 and connected to the electronic device 10 via a network. Examples of such network include, but not limited to, Internet, intranet, Local Area Network (LAN), mobile communication network, or any combination thereof. The transmission module 106 provides communication functions, e.g., transmitting data to the processor 102 and/or a peer device.

Embodiment 10

Embodiment 10 of the present disclosure provides a computer readable storage medium. The computer readable storage medium stores computer executable instructions which, when executed by a processor, perform the above methods for control of QoS.

Example 1

Figure 11:
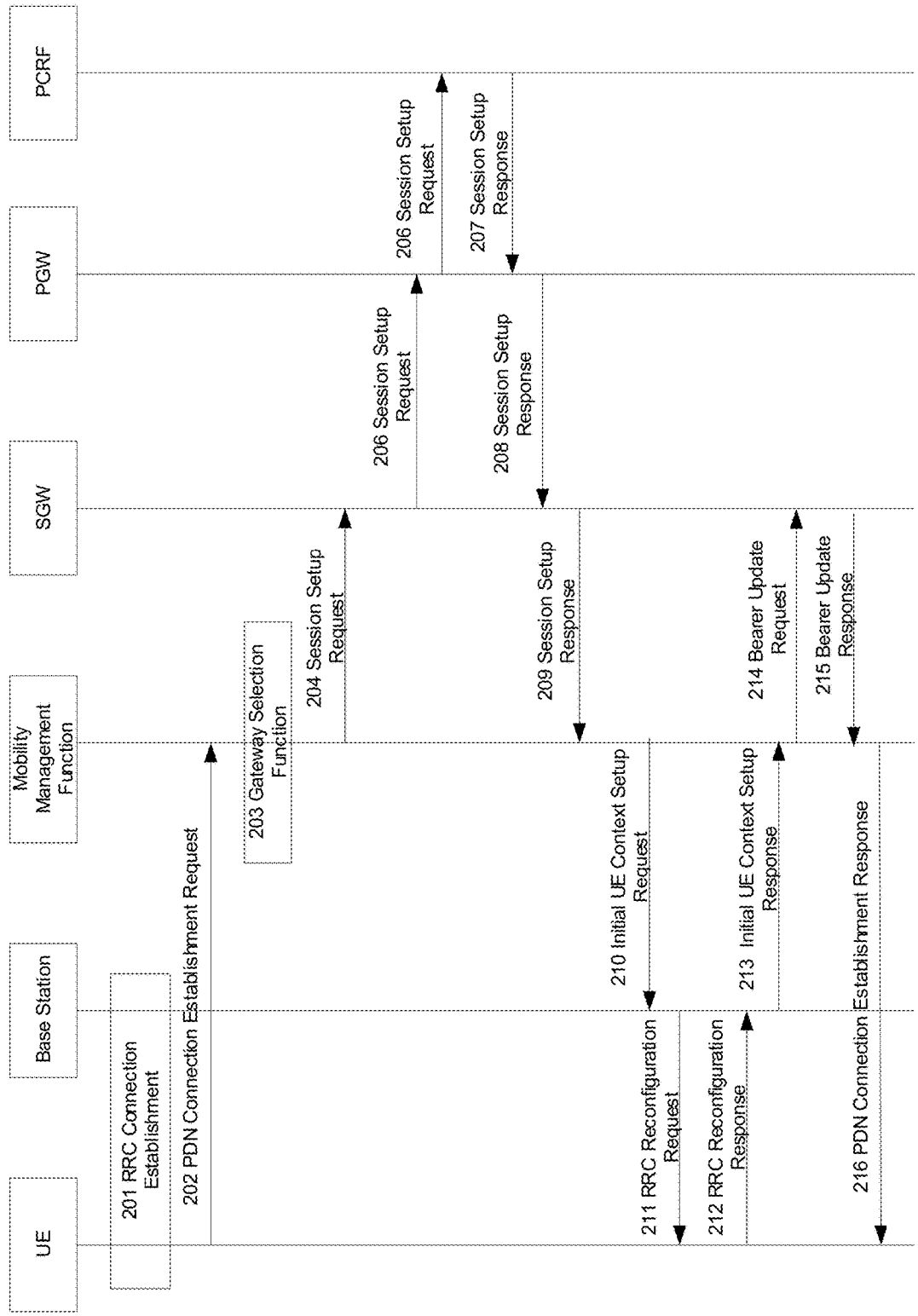
FIG. 11 is an information sequence diagram of a method for control of QoS according to Example 1 of the present disclosure.

As shown in FIG. 11, in a 4G system, a UE makes a PDN connection establishment request. In this process, a new data transmission channel is established. Here, an SGW and a PGW serve as CN gateways and an MME servers as a CN control network element. A QoS control method includes the following steps.

At step 201, an RRC connection is established between a UE and a base station. In this process, a signaling connection is established between the UE and the base station over an air interface for subsequent information exchanges between them.

At step 202, the UE transmits a PDN connection establishment request to an MME (mobility management function) via the RRC connection. The message carries a temporary identifier of the UE and information on a session, e.g., an APN and a session type (IPv4, IPv6, IPv4v6, or non-IP). The base station adds information on a current cell of the UE to the message before transmitting it to the MME.

At step 203, the MME verifies a subscription, i.e., determining whether the APN and session type requested by the UE has been subscribed. If the verification succeeds, a PGW and an SGW are selected based on the information on the current cell of the UE, the information on the APN and so on.

At step 204, the MME assigns a CN flow identifier and transmits to the selected SGW a session setup request carrying the requested APN, the session type and the CN flow identifier.

At step 205, the SGW assigns a tunnel identifier corresponding to the UE for identifying a tunnel between the SGW and the PGW, and transmits to the PGW a session setup request carrying the APN information, the session type, the tunnel identifier and the CN flow identifier.

At step 206, upon receiving the session request, the PGW transmits to a PCRF entity a session setup request, requesting for a QoS policy.

At step 207, the PCRF determines QoS parameters for a default bearer of the PDN connection the UE requested to establish based on a user subscription and a network configuration associated with the APN, and transmits the QoS parameters to the PGW in a session setup response. The QoS parameters include a CQI, an ARP, a UE-AMBR and an APN-AMBR as described above. The CN flow identifier uniquely identifies the set of QoS parameters within a UE context. The PCRF further transmits uplink/downlink data flow characteristic information bound to the bearer to the PGW. The uplink/downlink data flow characteristic information can be a quintuple indicating source and destination addresses and port numbers of the data flow and a protocol number, or an application identifier.

At step 208, the PGW may also assign an IP address to the UE based on the session type information. The PGW assigns a tunnel identifier corresponding to the UE for identifying a tunnel corresponding to each UE between the SGW and the PGW. The PGW returns the CN flow identifier, the QoS parameters, the uplink data flow characteristic information, the tunnel identifier assigned by the PGW and optionally the IP address of the UE to the SGW in a session setup response. In this way, a UE tunnel can be established between the SGW and the PGW, for transmission of UP data.

At step 209, the SGW returns a session setup response to the MME, including the received CN flow identifier, QoS parameters and uplink data flow characteristic information, the tunnel identifier assigned by the SGW and optionally the IP address of the UE.

At step 210, the MME transmits to the base station an initial UE context setup request carrying the CN flow identifier and the corresponding QoS parameters (including information such as CQI, ARP and UE-AMBR). The CN flow identifier uniquely identifies the above QoS parameters within the UE context.

At step 211, the base station saves the CN flow identifier and the corresponding QoS parameters. If the base station has an existing radio bearer that can satisfy the QoS parameters, it decides to utilize the existing bearer. In this case, the base station transmits an RRC reconfiguration message to the UE, transmitting mapping information between the selected bearer and the CN flow identifier to the UE. If the base station finds no bearer satisfy the QoS parameters, it decides to establish a new radio bearer. In this case, the base station initiates an RRC reconfiguration procedure with the UE to establish a new radio bearer between the UE and the base station and transmits mapping information between the established new radio bearer and the CN flow identifier to the UE.

At step 212, the UE saves the mapping information between the radio bearer and the CN flow identifier and returns an RRC reconfiguration response to the base station.

At step 213, the base station assigns a tunnel identifier which uniquely identifies the UE and identifies a tunnel corresponding to each UE between the base station and the SGW, and then transmits an initial UE context setup response to the MME.

At step 214, the MME transmits a bearer update request to the SGW, transmitting the tunnel identifier assigned by the base station to the SGW.

At step 215, the SGW returns a bearer update response to the MME. In this way, a UE tunnel can be established between the base station and the SGW, for transmission of UP data.

At step 216, the MME returns to the UE a PDN connection establishment response carrying the CN flow identifier, the uplink data flow characteristic information and optionally the IP address of the UE. The UE saves the received information.

Example 2

When a UE transmits uplink data packets, a CN flow identifier is carried in each data packet to a base station. The base station transmits the data packets along with the corresponding CN flow identifier to a CN gateway via a tunnel.

When the CN gateway transmits downlink data, the CN flow identifier is carried in each data packet to the base station via the tunnel. The base station determines a corresponding radio bearer based on the CN flow identifier and then transmits the data packets to the UE over the radio bearer.

Figure 12:
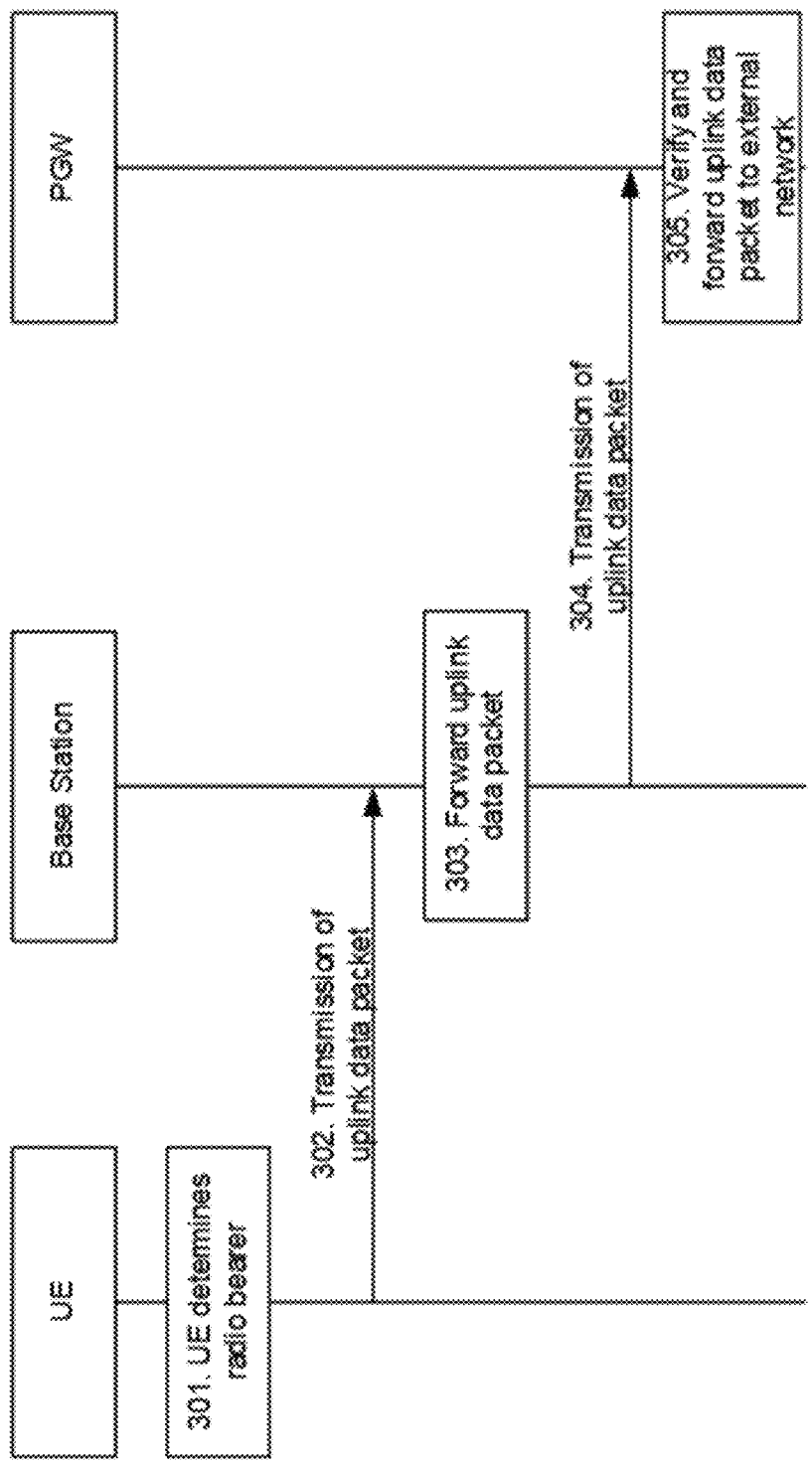
FIG. 12 is an information sequence diagram of a process for uplink data packet transmission according to Example 2 of the present disclosure.

As shown in FIG. 12, a process of transmitting an uplink data packet includes the following steps.

At step 301, when a UE needs to transmit an uplink data packet, it determines a CN flow identifier corresponding to the data packet based on obtained uplink data flow characteristic information, and then determines a radio bearer to be used for transmission based on the CN flow identifier.

At step 302, the UE adds the CN flow identifier to each uplink data packet and then transmits it to the base station over the selected radio bearer.

At step 303, the base station forwards the uplink data packet with the CN flow identifier to a PGW.

At step 304, the PGW verifies the received uplink data based on the CN flow identifier and the uplink data flow characteristic information, so as to check whether the UE has transmitted the data over the correct QoS channel, and forwards the uplink data to an external network when the verification succeeds.

Figure 13:
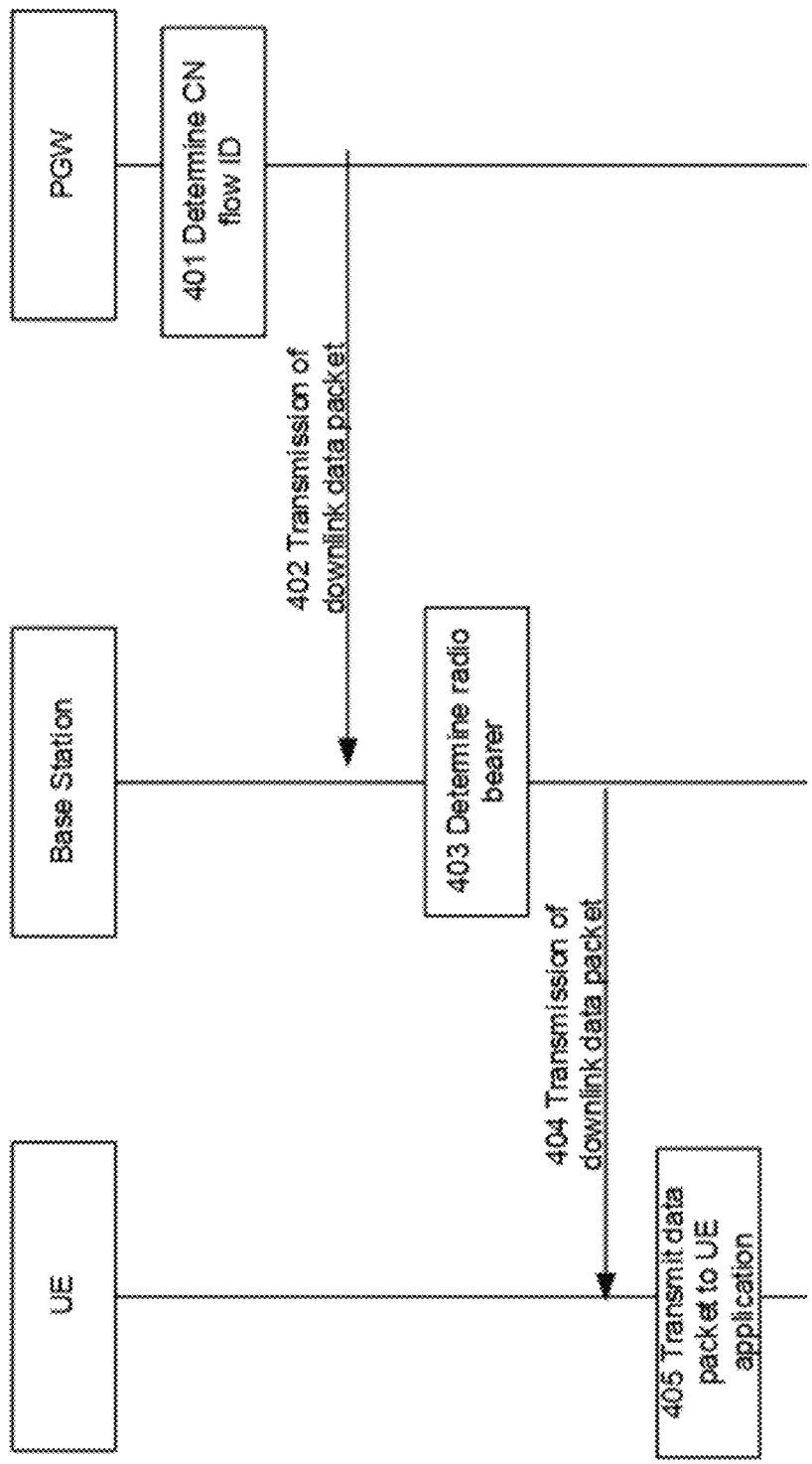
FIG. 13 is an information sequence diagram of a process for downlink data packet transmission according to Example 2 of the present disclosure.

As shown in FIG. 13, a process of transmitting a downlink data packet includes the following steps.

At step 401, upon receiving downlink data, a PGW determines a corresponding CN flow identifier based on downlink data flow characteristic information.

At step 402, the gateway includes the CN flow identifier in each downlink data packet and transmits the downlink data packet and the CN flow identifier via a UP tunnel between the PGW and an SGW and between the SGW and a base station.

At step 403, the base station determines a UE context based on an identifier of the UP tunnel and then determines a radio bearer based on the CN flow identifier carried in the data packet and information in the UE context.

At step 404, the base station transmits the data packet to the UE over the radio bearer, with or without the CN flow identifier.

At step 405, the UE transmits the received data to an application. If the data packet carries the CN flow identifier, the UE needs to release it before transmitting the data packet to the application.

Example 3

Figure 14:
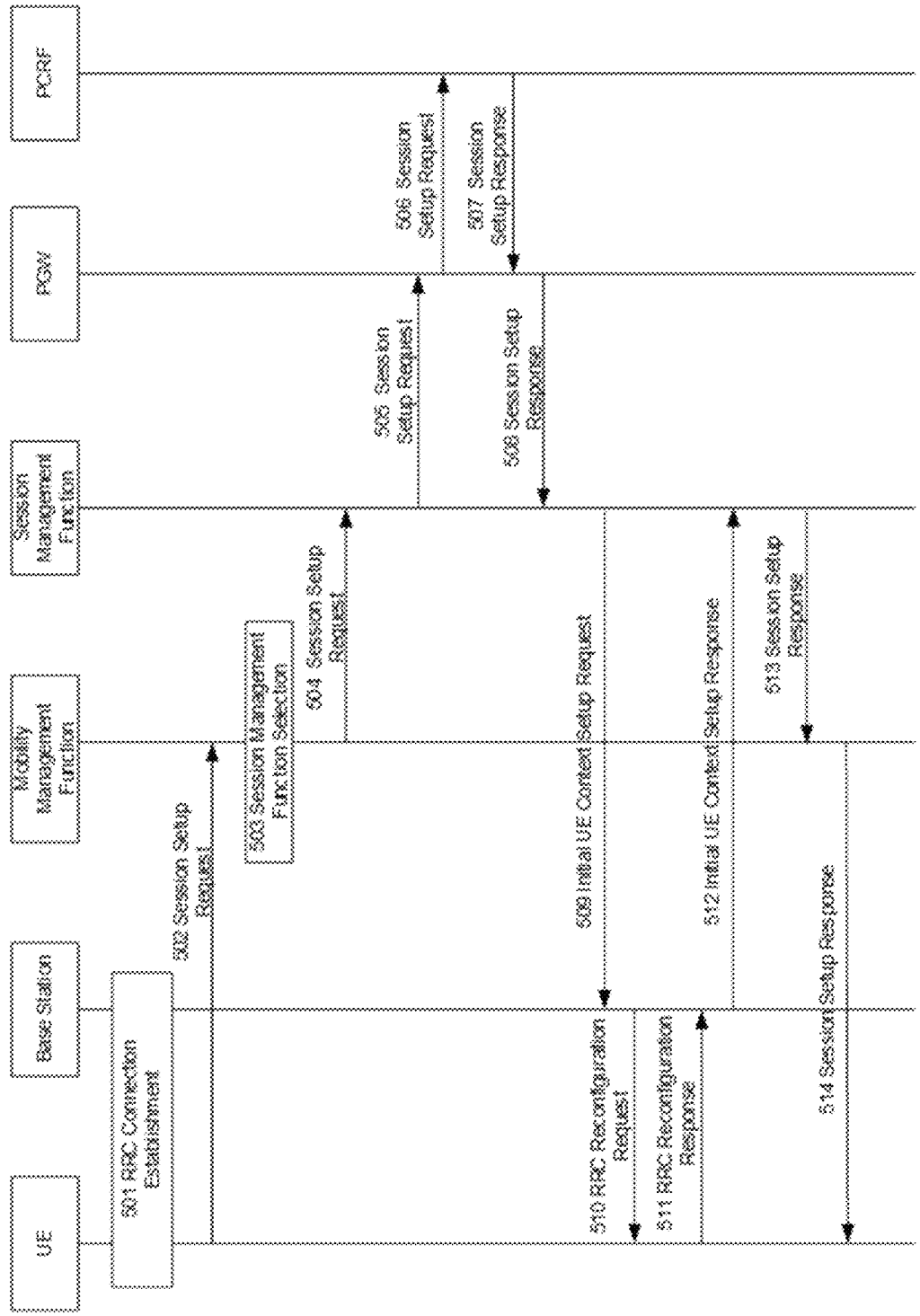
FIG. 14 is an information sequence diagram of a method for control of QoS according to Example 3 of the present disclosure.

As shown in FIG. 14, in a communication system where a session management function and a mobility management function are separate, a UE initiates a session connection establishment request procedure. In this procedure, a new data transmission channel is established. Here, the session management function and a PGW serve as CN gateways and the mobility management function serves as a CN control network element. A QoS control method includes the following steps.

At step 501, an RRC connection is established between a UE and a base station. In this process, a signaling connection is established between the UE and the base station over an air interface for subsequent information exchanges between them.

At step 502, the UE transmits a session setup request to a mobility management function via the RRC connection. The message carries a temporary identifier of the UE and information on a session, e.g., an APN and a session type (IPv4, IPv6, IPv4v6, or non-IP). The base station adds information on a current cell of the UE to the message before transmitting it to the mobility management function.

At step 503, the mobility management function verifies a subscription, i.e., determining whether the APN and session type requested by the UE has been subscribed. If the verification succeeds, a session management function is selected.

At step 504, the mobility management function transmits to the selected session management function a session setup request carrying information including the requested APN and the session type.

At step 505, the mobility management function assigns a CN flow identifier, selects a PGW based on the APN, and assigns a tunnel identifier corresponding to the UE. The mobility management function transmits to the selected PGW a session setup request carrying the APN information, the session type, the tunnel identifier and the CN flow identifier.

At step 506, upon receiving the session request, the PGW transmits to a PCRF entity a session setup request.

At step 507, the PCRF determines default QoS parameters of the PDN connection the UE requested to establish based on a user subscription and a network configuration associated with the APN, and transmits the QoS parameters to the PGW in a session setup response. The QoS parameters include a CQI, an ARP, a UE-AMBR and an APN-AMBR as described above. The CN flow identifier uniquely identifies the set of QoS parameters. The PCRF further transmits default uplink data flow characteristic information and downlink data flow characteristic information to the PGW. The uplink/downlink data flow characteristic information can be a quintuple indicating source and destination addresses and port numbers of the data flow and a protocol number, or an application identifier.

At step 508, the PGW may also assign an IP address to the UE based on the session type information. The PGW assigns a tunnel identifier corresponding to the UE. The PGW returns the CN flow identifier, the QoS parameters, the uplink data flow characteristic information, the tunnel identifier and optionally the IP address of the UE to the session management function in a session setup response. In this way, a UE tunnel can be established between the session management function and the PGW, for transmission of UP data.

At step 509, the session management function transmits to the base station an initial UE context setup request carrying the CN flow identifier and the corresponding QoS parameters (including information such as CQI, ARP and UE-AMBR). The CN flow identifier uniquely identifies the above QoS parameters within the UE context.

At step 510, the base station saves the CN flow identifier and the corresponding QoS parameters. If the base station has an existing radio bearer that can satisfy the QoS parameters, it decides to utilize the existing bearer. In this case, the base station transmits an RRC reconfiguration message to the UE, transmitting mapping information between the selected bearer and the CN flow identifier to the UE. If the base station finds no bearer satisfy the QoS parameters, it decides to establish a new radio bearer. In this case, the base station initiates an RRC reconfiguration procedure with the UE to establish a new radio bearer between the UE and the base station and transmits mapping information between the established new radio bearer and the CN flow identifier to the UE.

At step 511, the UE saves the mapping information between the radio bearer and the CN flow identifier and returns an RRC reconfiguration response to the base station.

At step 512, the base station assigns a tunnel identifier which uniquely identifies the UE, and then transmits an initial UE context setup response to the session management function.

At step 513, the session management function returns to the mobility management function a bearer update response containing the received QoS parameters, the CN flow identifier, the uplink data flow characteristic information and optionally the IP address of the UE.

At step 514, the mobility management function returns to the UE a PDN connection establishment response carrying the CN flow identifier, the uplink data flow characteristic information and optionally the IP address of the UE. The UE saves the received information.

With the above process, the PGW maintains a binding relation between the uplink and downlink data flow characteristic information and the CN flow identifier, the base station maintains a binding relation between the CN flow identifier and the radio bearer, and the UE maintains a binding relation between the uplink data flow characteristic information and the CN flow identifier and a binding relation between the CN flow identifier and the radio bearer.

Example 4

Figure 15:
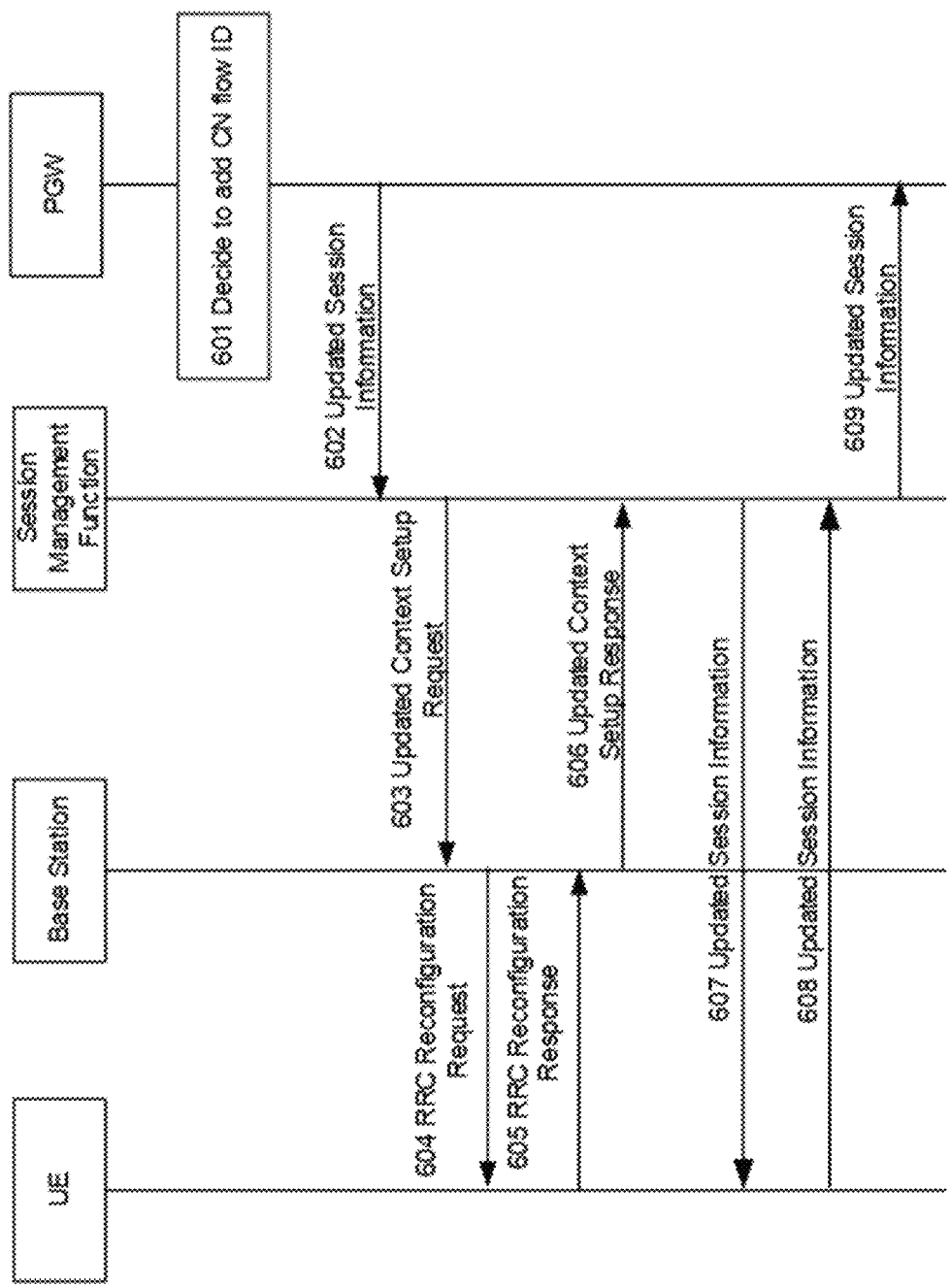
FIG. 15 is an information sequence diagram according to Example 4 of the present disclosure.

As shown in FIG. 15, a PGW decides to initiate addition of a CN flow identifier. Here, a session management function serves as a CN control network element. The session management function and the PGW serve as CN gateways. The following steps are involved.

At step 601, the PGW decides to add a new CN flow identifier based on a UE's request, a service request or a local terminal of an operator, e.g., in order to add a new data flow. However, QoS parameters for an old CN flow identifier cannot satisfy the QoS requirement of the data flow. In this case, it is required to request a new CN flow identifier. The PGW determines uplink/downlink characteristic information corresponding to the data flow and the corresponding QoS parameters, e.g., QCI, ARP, GBR and MBR.

At step 602, the PGW transmits to the session management function an updated session information request containing an indication of the new data flow, the characteristic information of the new uplink data flow and the QoS parameters corresponding to the new data flow.

At step 603, the session management function assigns a new CN flow identifier based on the received request, and then transmits to a base station an updated UE context establishment request carrying the new CN flow identifier and the corresponding QoS parameters.

At step 604, for the new CN flow identifier, the base station saves the new CN flow identifier and the corresponding QoS parameters. If the base station has an existing radio bearer that can satisfy the QoS parameters, it decides to utilize the existing bearer. In this case, the base station transmits an RRC reconfiguration message to the UE, transmitting mapping information between the selected bearer and the CN flow identifier to the UE. If the base station finds no bearer satisfy the QoS parameters, it decides to establish a new radio bearer. In this case, the base station initiates an RRC reconfiguration procedure with the UE to establish a new radio bearer between the UE and the base station and transmits mapping information between the established new radio bearer and the CN flow identifier to the UE.

At step 605, the UE updates the mapping information between the CN flow identifier and the radio bearer, and returns an RRC reconfiguration response to the base station.

At step 606, the base station transmits an updated UE context establishment response to the session management function.

At step 607, the session management function transmits a binding relation between the uplink data flow characteristic information and the new CN flow identifier to the UE in a NAS message.

At step 608, the UE saves the uplink data flow characteristic information and the new CN flow identifier, and returns a response message to the session management function.

At step 609, the session management function returns updated session information to the PGW. If the session management function has assigned the new CN flow identifier, it returns the CN flow identifier to the PGW, such that the PGW can update the binding relation between the CN flow identifier and the data flow characteristic information. When the PGW receives downlink data of the data flow, it transmits the data packets along with the new CN flow identifier to the base station via a tunnel.

Example 5

Figure 16:
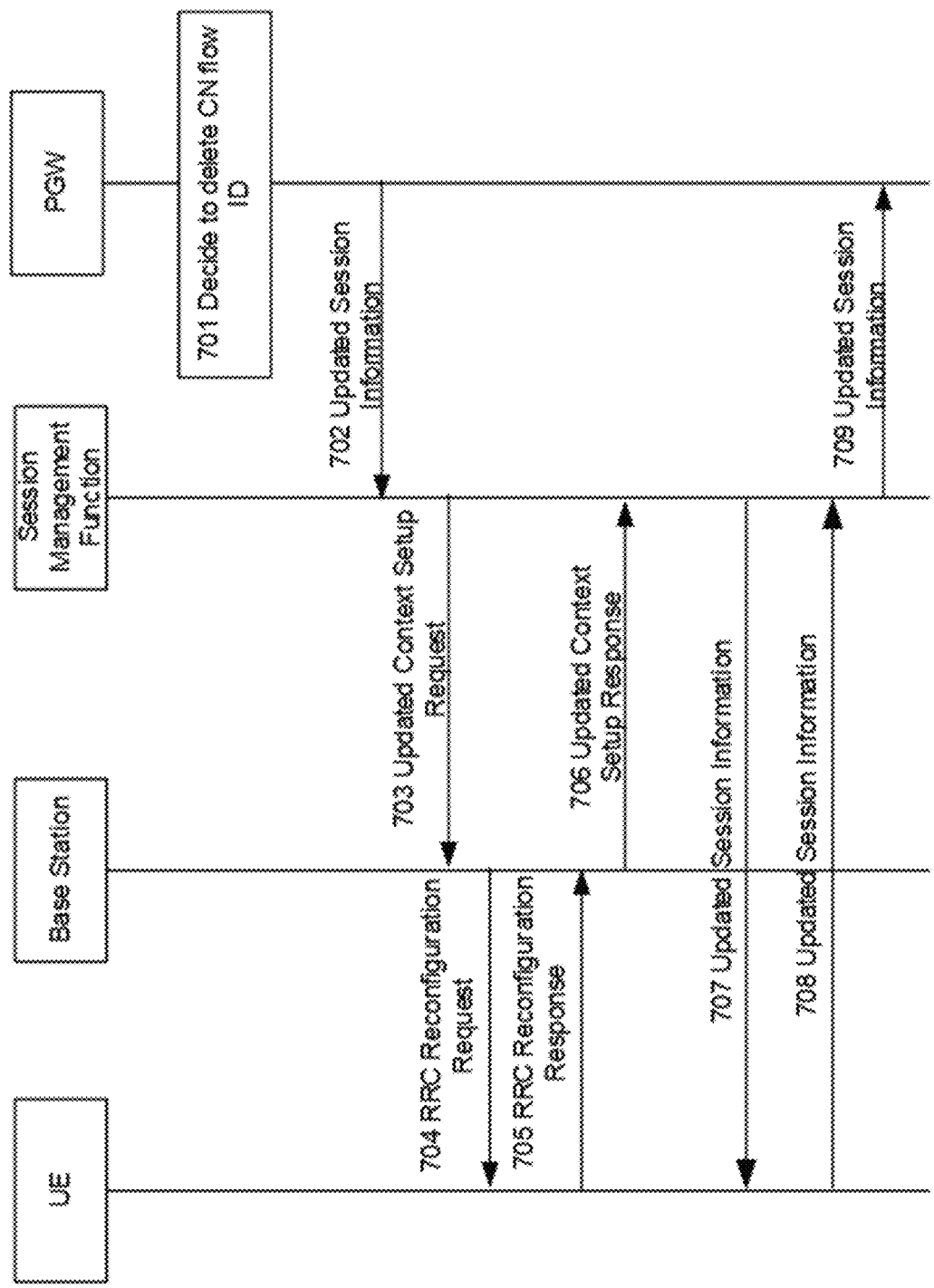
FIG. 16 is an information sequence diagram according to Example 5 of the present disclosure.

As shown in FIG. 16, a PGW decides to initiate deletion of a CN flow identifier. The following steps are involved.

At step 701, the PGW decides to release a CN flow identifier based on a UE's request, a service request or a local terminal of an operator. For example, when all data flows on a particular CN flow identifier have been released, the CN flow identifier needs to be released too.

At step 702, the PGW transmits to a session management function an updated session information request containing an indication of deletion of the data flows and the CN flow identifier to be released.

At step 703, the session management function transmits to a base station an updated UE context establishment request based on the received request, requesting to release the CN flow identifier information in the base station.

At step 704, the base station releases a binding relation between the CN flow identifier and a radio bearer. If the base station also decides to release the radio bearer corresponding to the CN flow identifier, it releases the radio bearer using an RRC reconfiguration procedure.

At step 705, the UE releases the radio bearer and returns an RRC reconfiguration response message to the base station.

At step 706, the base station transmits an updated UE context establishment response to the session management function.

At step 707, the session management function notifies the UE to release the CN flow identifier via a NAS message.

At step 708, the UE release all binding information corresponding to the CN flow identifier, including binding information between an uplink data flow identifier and the radio bearer, and returns a response to the session management function.

It is to be noted that the transmissions in the above steps 703 and 703 can be performed at the same time.

At step 709, the session management function returns updated session information to the PGW.

Example 6

Figure 17:
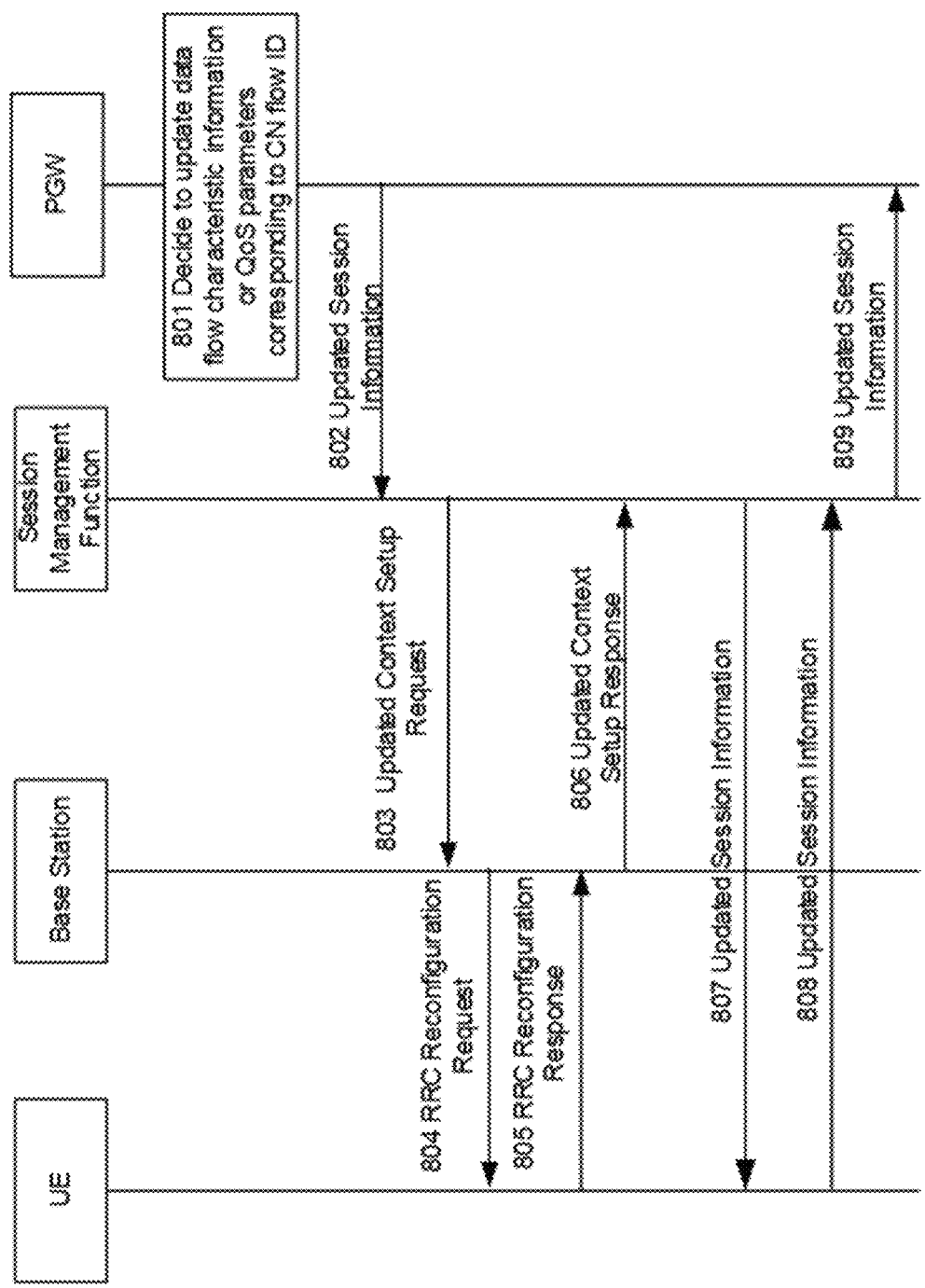
FIG. 17 is an information sequence diagram according to Example 6 of the present disclosure.

As shown in FIG. 17, a PGW decides to initiate update of QoS parameters of a CN flow identifier or an uplink/downlink flow identifier. The following steps are involved.

At step 801, the PGW decides to update QoS parameters corresponding to a CN flow identifier or to add or release data flow characteristic information bound to a CN flow identifier, based on a UE's request, a service request or a local terminal of an operator. The PGW determines new data flow characteristic information corresponding to the CN flow identifier and new corresponding QoS parameters, e.g., QCI, ARP, GBR and MBR.

At step 802, the PGW transmits to a session management function an updated session information request containing the CN flow identifier, the new uplink data flow characteristic information and the new QoS parameters.

At step 803, the session management function updates the QoS parameters corresponding to the CN flow identifier based on the received request, and then transmits to a base station an updated UE context establishment request carrying the CN flow identifier and the new QoS parameters.

At step 804, the base station saves the new QoS parameters corresponding to the CN flow identifier. The base station may decide to change nothing, establish a new radio bearer, release a radio bearer or modify an existing radio bearer.

If the base station determines that it has an existing radio bearer that can satisfy the new QoS parameters, it decides to utilize the existing bearer.

If the base station determines that the existing radio bearer cannot satisfy the QoS parameters and cannot be modified, it decides to establish a new radio bearer. In this case, the base station initiates an RRC reconfiguration procedure with the UE to establish a new radio bearer between the UE and the base station and transmits mapping information between the established new radio bearer and the CN flow identifier to the UE.

If the base station determines that the existing radio bearer cannot satisfy the QoS parameters but can be modified, it decides to modify the radio bearer. In this case, the base station initiates an RRC reconfiguration procedure with the UE to modify the radio bearer between the UE and the base station so as to satisfy the new QoS requirement.

After modifying the radio bearer, the base station releases the old radio bearer if it is not bound to any CN flow identifier.

At step 805, the UE updates the mapping information between the CN flow identifier and the radio bearer, and returns an RRC reconfiguration response to the base station.

At step 806, the base station transmits an updated UE context establishment response to the session management function.

At step 807, the session management function transmits a binding relation between the new uplink data flow characteristic information and the CN flow identifier to the UE in a NAS message.

At step 808, the UE saves the uplink data flow identifier and the CN flow identifier information, and returns a response to the session management function.

At step 809, the session management function returns updated session information to the PGW.

In the embodiment of the present disclosure, the base station is responsible for establishment, deletion and management of the radio bearer. There can be a multiple-to-one mapping between the CN flow identifiers and the radio bearer. The CN flow identifier may correspond to one data flow, so as to achieve control of each flow at the radio side. The CN flow identifier may correspond to an aggregation of multiple data flows, so as to achieve aggregated control of the multiple data flows at the radio side.

In the above embodiment, the types of QoS parameters are not limited to the QoS parameters in 4G. Rather, any QoS parameters can be used, e.g., information such as direct transmission packet loss rate, delay requirement, and the like.

In the above process, a PDN connection data channel is established from a UE to a PGW. The channel is characterized in that multiple CN flow identifiers can be mapped to one radio bearer and that the base station can decide whether to utilize the existing radio bearer or to establish a new radio bearer. With these characteristics, the problem described in the background section that in the 4G network architecture a radio bearer cannot be shared across PDN connections and the base station cannot autonomously decide whether to establish a radio bearer or not can be solved.

It can be appreciated by those skilled in the art that all or part of the steps in the above methods can be implemented by hardware (e.g., a processor) following instructions of a program. The program can be stored in a computer readable storage medium, such as a Read Only Memory (ROM), a magnetic disk or an optical disc. Optionally, all or part of the steps in the above embodiments can be implemented by one or more integrated circuits. Accordingly, the respective modules/units in the above embodiments can be implemented in hardware, e.g., when the respective functions are implemented by integrated circuits, or in software functional modules, e.g., when the respective functions are implemented by a processor executing program instructions stored in a memory. The present disclosure is not limited to any specific form of combination of hardware and software.

It is to be noted here that there can be more other embodiments of the present disclosure. Various alternatives and variants can be made to the present disclosure by those skilled in the art without departing from the spirit and essence of the present disclosure. These alternatives and variants are to be encompassed by the scope of the present disclosure, which is defined by the claims as attached.

INDUSTRIAL APPLICABILITY

With the solutions according to the embodiments of the present disclosure, a base station receives a CN flow identifier and information on a corresponding QoS parameter of a Packet Data Network (PDN) connection as transmitted from a CN control network element and creates a mapping relation between the CN flow identifier and the corresponding QoS parameter. The base station determines whether a radio bearer satisfying a requirement of the QoS parameter exists between a user terminal and the base station and, if so, utilizes the existing radio bearer satisfying the requirement of the QoS parameter, or otherwise establishes a new radio bearer between the user terminal and the base station. The base station transmits a mapping relation between the existing radio bearer or the new radio bearer and the CN flow identifier to the user terminal. With the present disclosure, a radio bearer can be shared across PDN connections. The base station can autonomously decide whether to establish a radio bearer. In this way, the accuracy of QoS control can be improved and resources over the air interface can be saved.

What is claimed is:
1. A method for wireless communication, comprising:
assigning, by a session management function in a core network, a flow identifier that has a binding relationship with a radio bearer based on information about a flow-based Quality of Service (QOS) requirement, wherein the flow identifier corresponds to information about one or more QoS parameters of a Packet Data Network (PDN) connection; and transmitting, by the session management function, the flow identifier and the information about the one or more QoS parameters to a base station, wherein the session management function is separated from a mobility management function in the core network, and wherein the session management function and a PDN Gateway (PGW) serve as a control plane (CP) gateway that is in communication with an entity that is an access point of a data network and a user plane anchor for a user equipment.

2. The method of claim 1, wherein the flow identifier corresponds to information about a data flow characteristic of the PDN connection.

3. The method of claim 1, comprising:

transmitting, by the session management function, an update of the information about the one or more QoS parameters to the base station.

4. The method of claim 1, comprising:

transmitting, by the session management function, an update of the binding relationship between the flow identifier and the radio bearer to the base station.

5. A method for wireless communication, comprising:

assigning, by a session management function in a core network, a flow identifier that has a binding relationship with a radio bearer based on information about a flow-based Quality of Service (QOS) requirement, wherein the flow identifier corresponds to information about a data flow characteristic of a Packet Data Network (PDN) connection; and transmitting, by the session management function, the flow identifier and the information about the data flow characteristic to a user equipment, wherein the session management function is separated from a mobility management function in the core network, and wherein the session management function and a PDN Gateway (PGW) serve as a control plane (CP) gateway that is in communication with an entity that is an access point of a data network and a user plane anchor for the user equipment.

6. The method of claim 5, wherein the flow identifier corresponds to information about one or more QoS parameters of the PDN connection.

7. The method of claim 5, comprising:

transmitting, by the session management function, an update of the binding relationship between the flow identifier and the radio bearer to the user equipment.

8. A device implemented as a session management function in a core network for wireless communication, comprising a processor that is configured to:

assign a flow identifier that has a binding relationship with a radio bearer based on information about a flow-based Quality of Service (QOS) requirement, wherein the flow identifier corresponds to information about one or more QoS parameters of a Packet Data Network (PDN) connection; and transmit the flow identifier and the information about the one or more QoS parameters to a base station, wherein the session management function is separated from a mobility management function in the core network, and wherein the session management function and a PDN Gateway (PGW) serve as a control plane (CP) gateway that is in communication with an entity that is an access point of a data network and a user plane anchor for a user equipment.

9. The device of claim 8, wherein the flow identifier corresponds to information about a data flow characteristic of the PDN connection.

10. The device of claim 8, wherein the processor is configured to:

transmit an update of the information about the one or more QoS parameters to the base station.

11. The device of claim 8, wherein the processor is configured to:

transmit an update of the binding relationship between the flow identifier and the radio bearer to the base station.

12. A device implemented as a session management function in a core network for wireless communication, comprising a processor that is configured to:

assign a flow identifier that has a binding relationship with a radio bearer based on information about a flow-based Quality of Service (QOS) requirement, wherein the flow identifier corresponds to information about a data flow characteristic of a Packet Data Network (PDN) connection; and transmit the flow identifier and the information about the data flow characteristic to a user equipment, wherein the session management function is separated from a mobility management function in the core network, and wherein the session management function and a PDN Gateway (PGW) serve as a control plane (CP) gateway that is in communication with an entity that is an access point of a data network and a user plane anchor for the user equipment.

13. The device of claim 12, wherein the flow identifier corresponds to information about one or more QoS parameters of the PDN connection.

14. The device of claim 12, wherein the processor is configured to:

transmit an update of the binding relationship between the flow identifier and the radio bearer to the user equipment.

* * * * *